(12) United States Patent
Nakatomi et al.

(10) Patent No.: US 9,131,109 B2
(45) Date of Patent: Sep. 8, 2015

(54) INFORMATION PROCESSING DEVICE, DISPLAY CONTROL SYSTEM, AND COMPUTER PROGRAM PRODUCT

(71) Applicants: Masashi Nakatomi, Tokyo (JP); Yuuji Kasuya, Kanagawa (JP)

(72) Inventors: Masashi Nakatomi, Tokyo (JP); Yuuji Kasuya, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 5 days.

(21) Appl. No.: 14/202,111

(22) Filed: Mar. 10, 2014

(65) Prior Publication Data

US 2014/0253670 A1    Sep. 11, 2014

(30) Foreign Application Priority Data

Mar. 11, 2013  (JP) ................................ 2013-048368

(51) Int. Cl.
*H04N 7/15* (2006.01)
*H04L 29/06* (2006.01)
*H04L 12/18* (2006.01)

(52) U.S. Cl.
CPC .............. *H04N 7/15* (2013.01); *H04L 12/1822* (2013.01); *H04L 65/403* (2013.01)

(58) Field of Classification Search
CPC ........................... H04L 12/1822; H04L 65/403
USPC ........................................................ 348/14.08
See application file for complete search history.

(56) References Cited

U.S. PATENT DOCUMENTS

| | | | |
|---|---|---|---|
| 8,379,075 B2* | 2/2013 | Hagen | 348/14.08 |
| 8,462,103 B1* | 6/2013 | Moscovitch et al. | 345/156 |
| 2006/0129539 A1 | 6/2006 | Nakatomi | |
| 2007/0050325 A1 | 3/2007 | Nakatomi et al. | |
| 2008/0229407 A1 | 9/2008 | Nakatomi | |
| 2008/0235776 A1 | 9/2008 | Nakatomi et al. | |
| 2009/0073488 A1 | 3/2009 | Nakatomi et al. | |
| 2009/0231637 A1 | 9/2009 | Kemmochi et al. | |
| 2010/0091086 A1* | 4/2010 | Hagen | 348/14.09 |
| 2010/0322519 A1 | 12/2010 | Kasuya et al. | |
| 2010/0324946 A1 | 12/2010 | Ohmura et al. | |
| 2011/0112835 A1 | 5/2011 | Shinnishi et al. | |

(Continued)

FOREIGN PATENT DOCUMENTS

| | | |
|---|---|---|
| JP | 07-030877 | 1/1995 |
| JP | 08-256316 | 10/1996 |

(Continued)

*Primary Examiner* — Creighton Smith
(74) *Attorney, Agent, or Firm* — Oblon, McClelland, Maier & Neustadt, L.L.P.

(57) ABSTRACT

An information processing device displays a first image and a second image, which is obtained by an image capturing unit by capturing the image in front of a display screen of a first display device capable of displaying the first image, on a second display device that is installed at a different location than the first display device. The information processing device includes a display control unit that displays the first image and the second image on the second display device in such a way that a display position of the first image in a left and right direction with reference to a display position of the second image when facing the second display device is opposite to a display position of the first image in the left and right direction with reference to the position of the image capturing unit when facing the display screen.

15 Claims, 30 Drawing Sheets

(56) References Cited

U.S. PATENT DOCUMENTS

| | | |
|---|---|---|
| 2011/0210908 A1 | 9/2011 | Kasuya et al. |
| 2011/0216222 A1 | 9/2011 | Niyagawa et al. |
| 2011/0221773 A1 | 9/2011 | Kasuya et al. |
| 2012/0014672 A1 | 1/2012 | Kasuya |
| 2012/0069045 A1 | 3/2012 | Hashimoto et al. |
| 2012/0113238 A1 | 5/2012 | Yamamoto et al. |
| 2012/0113255 A1 | 5/2012 | Kasuya et al. |
| 2012/0127323 A1 | 5/2012 | Kasuya et al. |
| 2012/0219140 A1 | 8/2012 | Iga et al. |
| 2013/0063547 A1 | 3/2013 | Kasuya et al. |
| 2013/0335369 A1 | 12/2013 | Nakatomi et al. |
| 2013/0339271 A1 | 12/2013 | Kasuya et al. |
| 2014/0019378 A1 | 1/2014 | Okuyamai et al. |

FOREIGN PATENT DOCUMENTS

| | | |
|---|---|---|
| JP | 11-103499 | 4/1999 |
| JP | 2009-089324 | 4/2009 |
| JP | 2010-028299 | 2/2010 |
| JP | 2010-239583 | 10/2010 |
| JP | 2013-197838 | 9/2013 |

\* cited by examiner

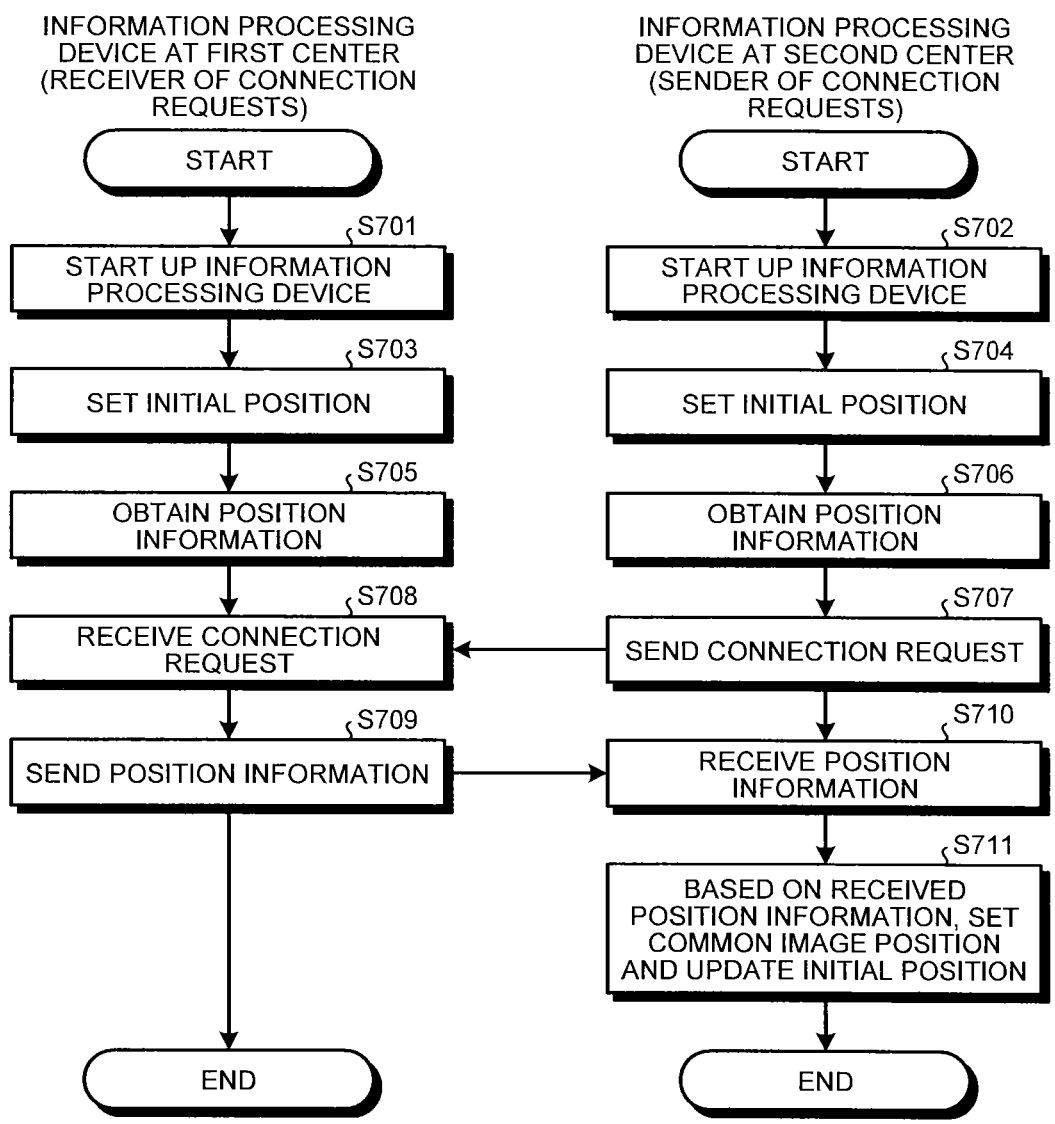

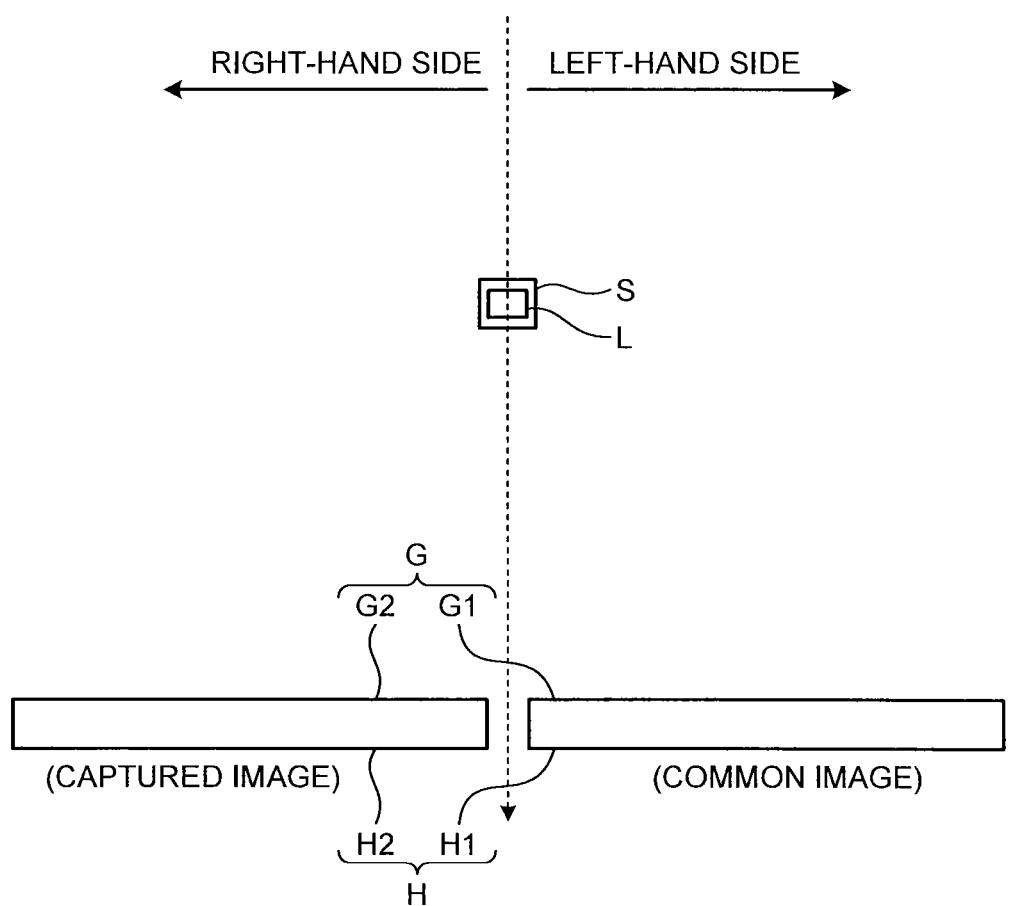

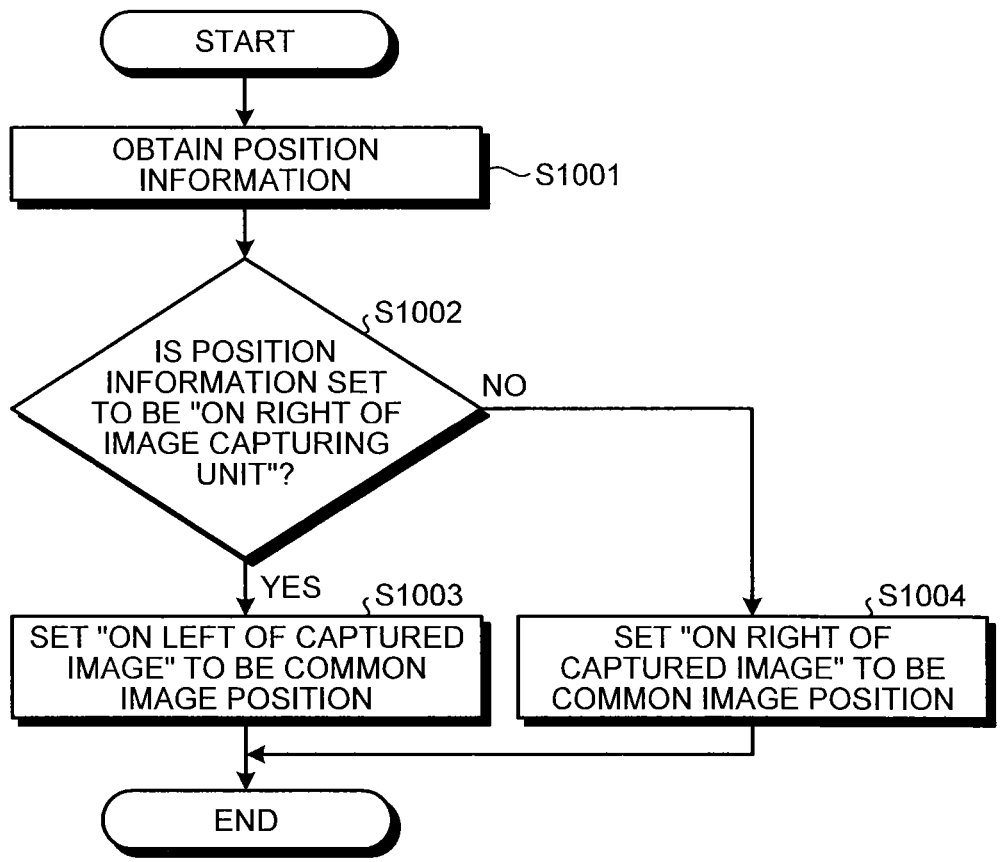

INFORMATION PROCESSING DEVICE, DISPLAY CONTROL SYSTEM, AND COMPUTER PROGRAM PRODUCT

CROSS-REFERENCE TO RELATED APPLICATIONS

The present application claims priority to and incorporates by reference the entire contents of Japanese Patent Application No. 2013-48368 filed in Japan on Mar. 11, 2013.

BACKGROUND OF THE INVENTION

1. Field of the Invention

The present invention relates to an information processing device, a display control system, and a computer program product.

2. Description of the Related Art

While performing communication among a plurality of locations (centers) during, for example, a teleconference session; there are times when captured images (examples of second images) that are obtained by image capturing units installed at respective locations are displayed on display units installed at respective locations. Besides, there are also times when not only the captured images are displayed on the display units installed at respective locations but also common images (example of first images), which represent the conference material commonly displayed on the display units installed at respective locations and which are used for the communication purposes, are displayed on the display units. More particularly, a technology (what is called a PC screen sharing function) has been disclosed by which the captured images and the common images are displayed on the screens of personal computers (PCs) (hereinafter, called PC screens) installed at respective locations from which communication is performed.

However, in the conventional PC screen sharing function, particularly, when a large screen is used as the display screen for displaying the capturing images and the common images; if the position of a common image with reference to the position of a captured image on that PC screen (i.e., whether the common image is on the left of the captured image or on the right of the captured image on the PC screen) is set to be identical among the locations, then there is a possibility that a person captured in the captured image is displayed to be looking in the opposite direction to the position of the common image with reference to the position of the captured image when facing the PC screen.

More particularly, if the common image is displayed on the left of a captured image on the PC screen installed at a first location, then a person who is present at the first location and who is looking at the common image on the PC screen has his or her line of sight directed left when facing the PC screen; while a person who is captured in the captured image, which is obtained by the image capturing unit installed at the first location, is looking right. At that time, at a second location too, if the common image is displayed on the left of the captured image (which is obtained by the image capturing unit installed at the first location) on the PC screen; then, although the person captured in the captured images is looking right, the common image is displayed on the left of the captured image on the PC screen (thus, the person captured in the captured image happens to look in the opposite direction to the position of the common image with reference to the captured image when facing the PC screen). For that reason, as far as a person who is viewing the PC screen at the second location is concerned, he or she may get the impression that the person viewing the PC screen at the first location is not looking at the common image and may further get the impression that the person does not have interest in the common image.

In this case, on the PC screen installed at the second location, the position of the captured image and the position of the common image in the left and right direction can be manually interchanged. However, there can be times when nobody is aware of the fact that the persons captured in the captured image are looking in the opposite direction to the position of the common image with reference to the captured image when facing the PC screen, or there can be times when it is complicated to perform the operation of interchanging the position of the captured image and the position of the common image in the left and right direction. Alternatively, it is also possible to think of a method in which image processing is performed with respect to the captured image for the purpose of performing direction transform of the persons captured in that captured image. However, it then becomes necessary to perform such image processing for each person captured in the captured image. For that reason, the persons captured in the captured images get partitioned on a person-by-person basis, thereby leading to a loss in the sense of togetherness of a plurality of persons captured in the captured image or leading to an inconsistency between the background captured in the captured image and the lines of sight of the persons. Besides, if a plurality of persons captured in the captured images is not looking at the same object, then it may result in giving an impression that each person is looking at a different object.

In view of the issues mentioned above, there is a need to provide an information processing device, a display control system, and a computer program product by which, when a first image and a second image, which is obtained by an image capturing unit by capturing the image in front of a display screen of another display device having a display area capable of displaying the first image, is displayed on a display device that is installed at a different location than the other display device; it becomes possible to prevent a situation in which the lines of sight of the persons captured in the second image are not directed in the direction of the display position of the first image and thus appear unnatural.

SUMMARY OF THE INVENTION

It is an object of the present invention to at least partially solve the problems in the conventional technology.

An information processing device displays a first image and a second image, which is obtained by an image capturing unit by capturing the image in front of a display screen of a first display device capable of displaying the first image from around the display screen, on a second display device that is installed at a different location than the first display device. The information processing device includes a display control unit that displays the first image and the second image on the second display device in such a way that, when displaying the first image and the second image side-by-side in a left and right direction when facing the second display device, a display position of the first image in the left and right direction with reference to a display position of the second image when facing the second display device is opposite to a display position of the first image in the left and right direction with reference to the position of the image capturing unit when facing the display screen.

A display control system displays a first image and a second image, which is obtained by an image capturing unit by capturing the image in front of a display screen of a first display device capable of displaying the first image from around the display screen, on a second display device that is installed at a different location than the first display device. The display control system includes a display control unit that displays the first image and the second image on the second display device in such a way that, when displaying the first image and the second image side-by-side in the left and right direction when facing the second display device, a display position of the first image in the left and right direction with reference to a display position of the second image when facing the second display device is opposite to a display position of the first image in the left and right direction with reference to the position of the image capturing unit when facing the display screen.

A computer program product includes a non-transitory computer-usable medium having computer-readable program codes embodied in the medium. The program codes, when executed by a computer that controls an information processing device which displays a first image and displays a second image obtained by an image capturing unit by capturing the image in front of a display screen of a first display device capable of displaying the first image from around the display screen, on a second display device that is installed at a different location than the first display device, cause the computer to function as: a display control unit that displays the first image and the second image on the second display device in such a way that, when displaying the first image and the second image side-by-side in the left and right direction when facing the second display device, a display position of the first image in the left and right direction with reference to a display position of the second image when facing the second display device is opposite to a display position of the first image in the left and right direction with reference to the position of the image capturing unit when facing the display screen.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a flowchart for explaining a sequence of operations during an image display operation performed in the information processing devices according to the first embodiment;

FIG. 8 is a diagram for explaining a position information obtaining method implemented by a camera display positional relationship obtaining unit according to the first embodiment;

FIG. 9 is a diagram illustrating an example of position information and a common image position stored in a positional relationship storing unit of the information processing device according to the first embodiment;

FIG. 10 is a flowchart for explaining a sequence of operations during an operation by which a positional relationship determining unit of the information processing device according to the first embodiment sets the common image position;

DETAILED DESCRIPTION OF THE PREFERRED EMBODIMENTS

Embodiments of an information processing device, a display control device, and a computer program product according to the present invention are described in detail below with reference to the accompanying drawings.

First Embodiment

Figure 1:
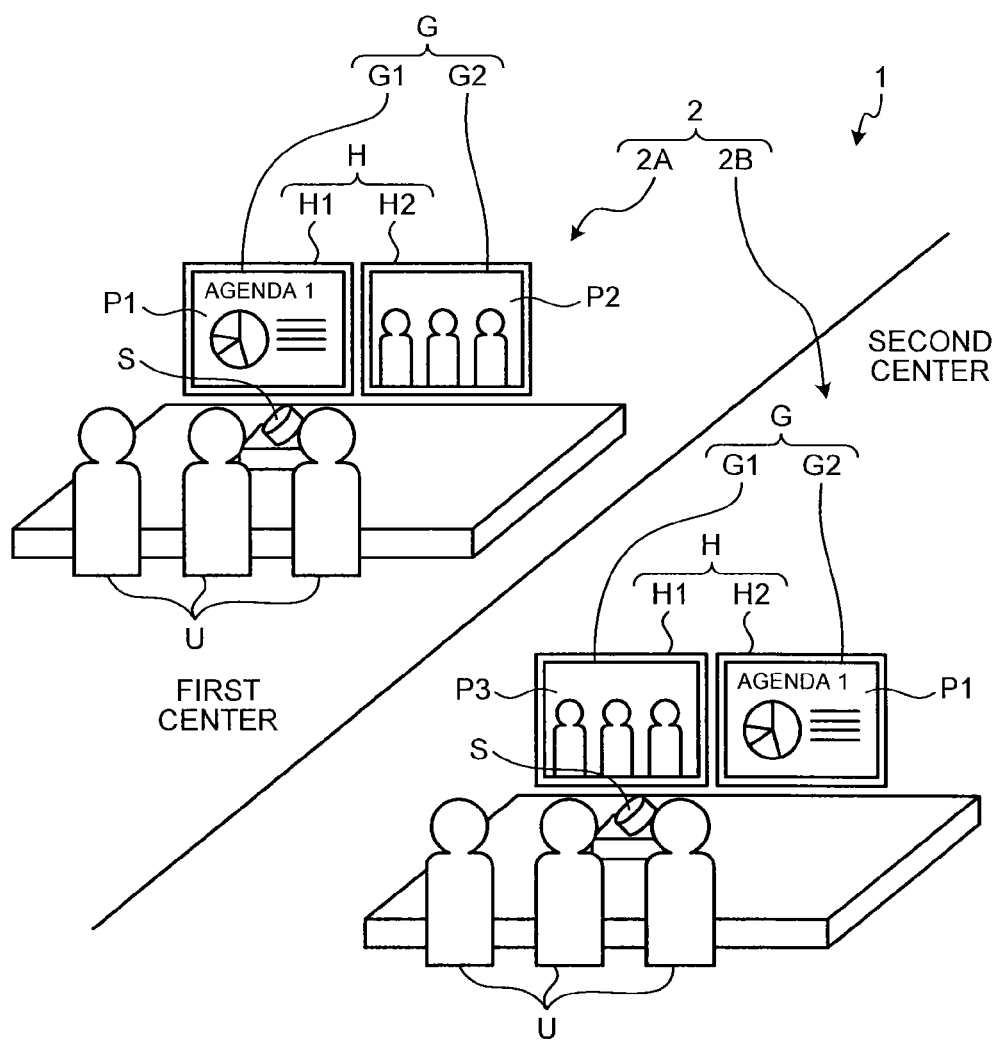
FIG. 1 is a diagram illustrating a configuration of a display control system according to a first embodiment.

FIG. 1 is a diagram illustrating a configuration of a display control system according to a first embodiment. A display control system 1 according to the first embodiment is, for example, a communication system such as a teleconference system that is used for communication by participants U, who participate in a conference across different locations, while looking at images displayed on display screens G (in the first embodiment, a primary display screen G1 and a secondary display screen G2) of display devices H (in the first embodiment, a primary display device H1 and a secondary display device H2) that are installed at the different locations (in the first embodiment, a first center and a second center). In the first embodiment, the explanation is given for an example in which the display control system 1 is implemented in a teleconference system. Alternatively, the display control system 1 can also be implemented in an education system that is used in communication between teachers and students across different locations.

As illustrated in FIG. 1, the display control system 1 includes a plurality of information processing devices 2 each of which is installed at a different center (in the present embodiment, the display control system 1 includes an information processing device 2A installed at a first center and an information processing device 2B installed at a second center). The information processing devices 2 are connected to each other in a communicable manner via a network N (see FIG. 4). Herein, the information processing devices 2 are, for example, communication terminals such as remote conference terminals.

The information processing device 2A, which is installed at the first center, displays, on the display screens G of the display devices H that are installed at the first center, a common image P1 (for example, an image of conference material) and a captured image P2 (an example of a second image) that is obtained by an image capturing unit S by capturing the image in front of the display screens G of the display devices H, which are installed at the second center and which are capable of displaying the common image P1, from around the display screens G. The image capturing unit S is installed at each center in such a way that it captures the participants U present at that center from the front of those participants U. Herein, the common image P1 is an example of first images that are commonly displayed in the display devices H installed at the first center and the display devices H installed at the second center. In the first embodiment, the common image P1 represents a material image obtained by capturing the image of the conference material or represents a common image stored in the information processing device 2 at each center.

With reference to FIG. 1, in the information processing device 2A installed at the first center, when seen from the participants U participating at the first center (in other words, when facing the display screens G of the display devices H installed at the first center), the common image P1 is displayed on the left (i.e., displayed on the primary display screen G1 of the primary display device H1) and the captured image P2 is displayed on the right (i.e., displayed on the secondary display screen G2 of the secondary display device H2). Thus, in the information processing device 2A installed at the first center, the common image P1 and the captured image P2 are displayed side-by-side in the left and right direction when facing the display devices H (the display screens G) installed at the first center.

The information processing device 2B, which is installed at the second center, displays, on the display screens G of the display devices H installed at the second center, the common image P1 and a captured image P3 (an example of second images) that is obtained by the image capturing unit S by capturing the image in front of the display screens G of the display devices H, which are installed at the first center and which are capable of displaying the common image P1, from around the display screens G.

With reference to FIG. 1, in the information processing device 2B installed at the second center, when seen from the participants U participating at the second center (in other words, when facing the display screens G of the display devices H installed at the second center), the captured image P3 is displayed on the left (i.e., displayed on the primary display screen G1 of the primary display device H1) and the common image P1 is displayed on the right (i.e., displayed on the secondary display screen G2 of the secondary display device H2). Thus, in the information processing device 2B installed at the second center, the common image P1 and the captured image P3 are displayed side-by-side in the left and right direction when facing the display devices H (the display screens) G installed at the second center.

Then, the information processing device 2A that is installed at the first center sends, to the information processing device 2B installed at the second center, position information that is related to the display position of the common image P1 in the left and right direction with reference to the position of the image capturing unit S when facing the display screens G of the display devices H installed at the first center. Moreover, the information processing device 2A that is installed at the first center receives, from the information processing device 2B installed at the second center, position information that is related to the display position of the common image P1 in the left and right direction with reference to the position of the image capturing unit S when facing the display screens G of the display devices H installed at the second center.

Furthermore, the information processing device 2B that is installed at the second center sends, to the information processing device 2A installed at the first center, the position information that is related to the display position of the common image P1 in the left and right direction with reference to the position of the image capturing unit S when facing the display screens G of the display devices H installed at the second center. Moreover, the information processing device 2B that is installed at the second center receives, from the information processing device 2A installed at the first center, the position information that is related to the display position of the common image P1 in the left and right direction with reference to the position of the image capturing unit S when facing the display screens G of the display devices H installed at the first center.

Explained below is an example of the position information that is sent and received between the information processing device 2A installed at the first center and the information processing device 2A installed at the second center. In the first embodiment, the position information represents the information indicating the display position of the common image P1 in the left and right direction with reference to the position of the image capturing unit S when facing the display screens G of the display devices H. More particularly, the position information represents information indicating that the display position of the common image P1 is either "on left of image capturing unit", or "on right of image capturing unit", or "neither on left nor on right" when facing the display screens G of the display devices H.

Figure 2A:
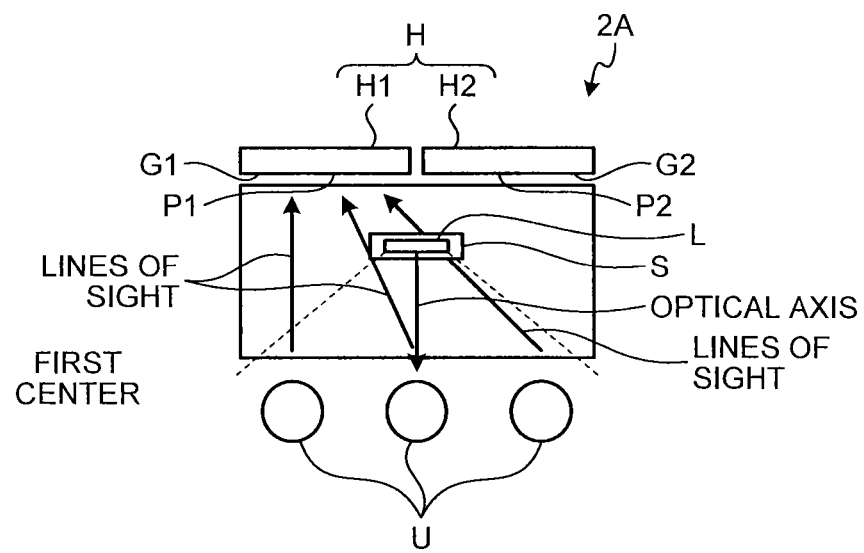
FIGS. 2A and 2B are diagrams for explaining the display positions of a common image and a captured image in the left and right direction in image processing devices according to the first embodiment.
Figure 2B:
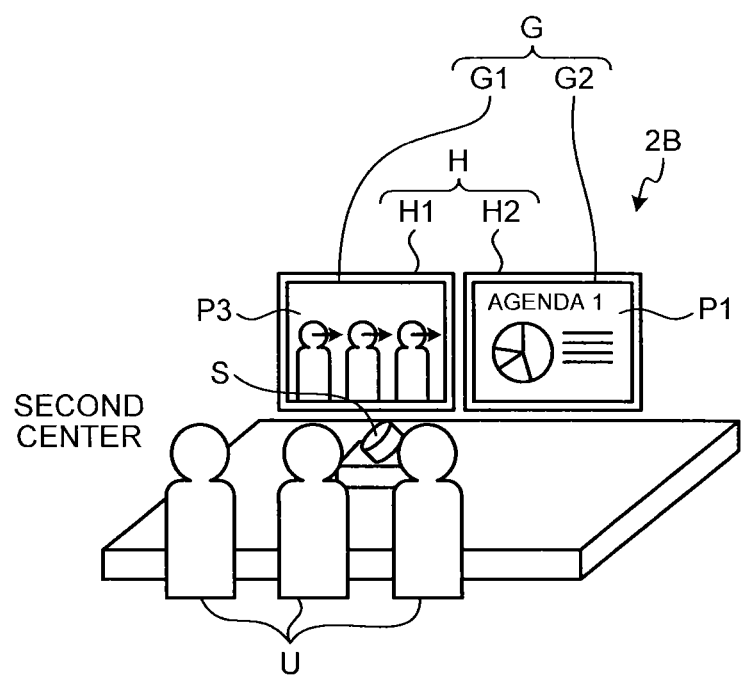

Herein, "on left of image capturing unit" indicates that, when facing the display screens G of the display devices H, the display position of the common image P1 is on the left of the optical axis of a lens L in the image capturing unit S (see FIGS. 2A and 2B). In contrast, "on right of image capturing unit" indicates that, when facing the display screens G of the display devices H, the display position of the common image P1 is on the right of the optical axis of the lens L in the image capturing unit S (see FIGS. 2A and 2B). For example, in the information processing device 2A that is installed at the first center as illustrated in FIG. 1, since the display position of the common image P1 is on the left of the image capturing unit S when facing the display screens G of the display devices H; the information processing device 2A sends "on left of image capturing unit" as the position information to the information processing device 2B that is installed at the second center.

Moreover, "neither on left nor on right" indicates a state in which it is not possible to identify the display position of the common image P1 with reference to the image capturing unit S when facing the display screens G of the display devices H. For example, "neither on left nor on right" indicates a state in which nothing is being displayed on the display screens G of the display devices H or indicates a state in which the common image P1 and the captured image P2 (or the captured image P3) are displayed side-by-side in the vertical direction on the display screens G of the display devices H.

FIGS. 2A and 2B are diagrams for explaining the display positions of the common image and the captured image in the left and right direction in the image processing devices according to the first embodiment. FIG. 2A is a diagram illustrating the information processing device 2A, which is installed at the first center, when viewed from above. FIG. 2B is a diagram for explaining the display positions of the common image P1 and the captured image P3 with respect to the primary display screen G1 of the primary display device H1 installed at the second center and with respect to the secondary display screen G2 of the secondary display device H2 installed at the second center.

For example, as illustrated in FIG. 2A, when facing the display screens G of the display devices H installed at the first center, when the common image P1 is displayed on the primary display screen G1 of the primary display device H1 that is installed on the left of the optical axis of the lens L in the image capturing unit S with reference to the optical axis of the lens L, the information processing device 2A installed at the first center sends "on left of image capturing unit" as the position information to the information processing device 2A installed at the second center. In that case, when facing the display screens G of the display devices H installed at the first center, the participants U participating at the first center have their lines of sight directed toward the left of the optical axis of the lens L. Hence, the participants U who are captured in the captured image P2 obtained by the image capturing unit S installed at the first center (i.e., captured in the captured image P3 displayed on one of the display devices H installed at the second center) have their lines of sight directed right as illustrated in FIG. 2B.

Thus, as illustrated in FIG. 2B, in the information processing device 2B installed at the second center, if the common image P1 is displayed in the direction of the lines of sight of the participants U who are captured in the captured image P3 (i.e., if the common image P1 is displayed right when facing the captured image P3); then the direction of the lines of sight of the participants U captured in the captured image P3 can be matched with the display position of the common image P1. As a result, at the time of performing communication using the common image P1; it becomes possible to prevent a situation in which the lines of sight of the participants U captured in the captured image P3 appear unnatural.

In that regard, in the first embodiment, when the information processing device 2B installed at the second center receives "on left of image capturing unit" as the position information from the information processing device 2A installed at the first center, the information processing device 2B displays the common image P1 on the right of the display position of the captured image P3 (in the first embodiment, on the secondary display screen G2 of the secondary display device H2) when facing the display screens G of the display devices H installed at the second center.

That is, in the first embodiment, the information processing device 2B installed at the second center displays the common image P1 and the captured image P3 on the display devices H, which are installed at the second center, in such a way that the display position of the common image P1 in the left and right direction with reference to the display position of the captured image P3 when facing the display devices H (examples of a second display device) installed at the second center is opposite to the display position of the common image P1 in the left and right direction with reference to the position of the image capturing unit S at the first center when facing the display screens G of the display devices H (examples of a first display device) installed at the first center.

In the first embodiment, at each center, a plurality of display devices is connected to a control unit 20 (see FIG. 3), which controls displaying of the common image P1 and the captured image P2 (or the captured image P3) on the display devices, via cables (not illustrated) that have "right" or "left" displayed thereon. Then, the participants U present at each center connect the cable having "left" displayed thereon to the display device on the left when facing the display screens G of the display devices H, and connect the cable having "right" displayed thereon to the display device on the right when facing the display screens G of the display devices H. As a result, of a plurality of display devices installed at each center, the display device present on the left when facing the display screens G functions as the primary display device H1, and the display device present on the right when facing the display screens G functions as the secondary display device H2.

Meanwhile, in the first embodiment, a plurality of display screens of a plurality of display devices installed at each center has an identical size and shape. However, this is not the only possible case. Alternatively, a plurality of display screens may also have different shapes and sizes.

Figure 3:
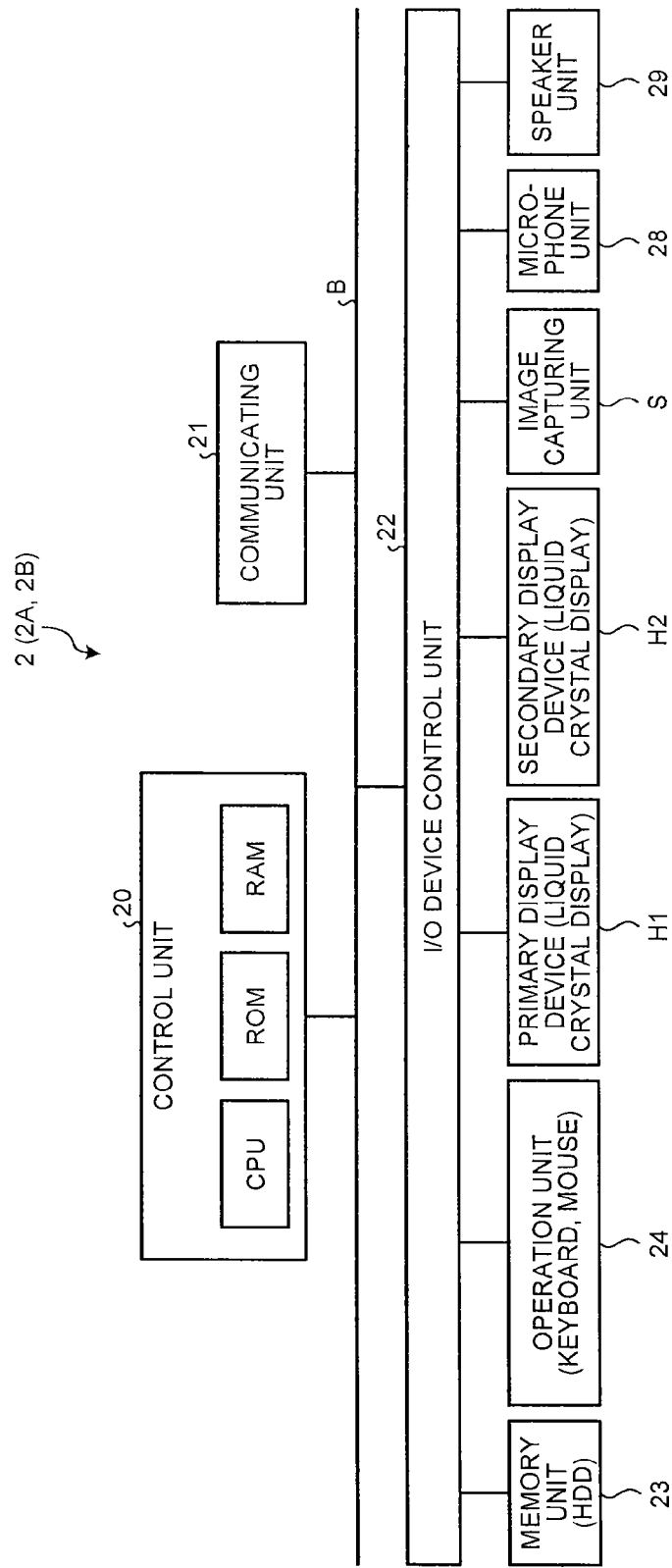
FIG. 3 is a block diagram illustrating a hardware configuration of the information processing devices according to the first embodiment.

FIG. 3 is a block diagram illustrating a hardware configuration of the information processing devices according to the first embodiment. The following explanation is given for a hardware configuration of the information processing device 2B installed at the second center. However, the information processing device 2A installed at the first center also has an identical hardware configuration. The information processing device 2B has the hardware configuration of a general-purpose computer in which the control unit 20, a communicating unit 21, and an I/O device control unit 22 are connected to each other by a bus B. Herein, the control unit 20 is configured with a central processing unit (CPU), a read only memory (ROM), and a random access memory (RAM).

To the control unit 20 are connected a memory unit 23, an operation unit 24, the primary display device H1, the secondary display device H2, the image capturing unit S, a microphone unit 28, and a speaker unit 29 via the bus B and via the I/O device control unit 22.

Figure 4:
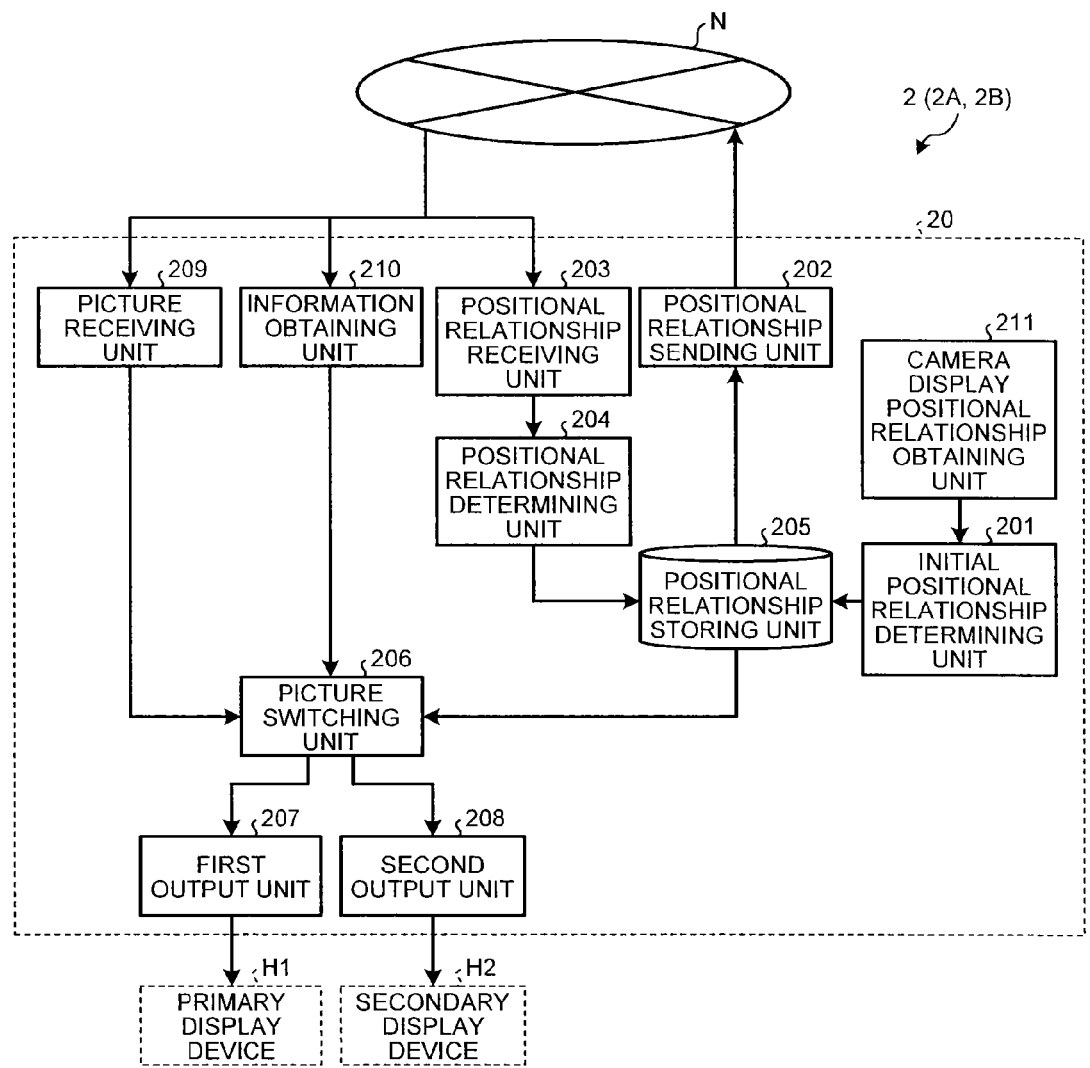
FIG. 4 is block diagram illustrating a functional configuration of the information processing devices according to the first embodiment.

In the control unit 20, the CPU loads computer programs, which are stored in the ROM or the memory unit 23, in the RAM and executes them so as to control the operations of various constituent elements connected thereto via the I/O device control unit 22 as well as to control sending a variety of data to and receiving a variety of data from the information processing device 2A that is installed at the first center and connected to the information processing device 2B via the communicating unit 21 and via the network N (see FIG. 4).

The communicating unit 21 sends a variety of data such as the captured image P2, the captured image P3, sounds, and the position information to the information processing device 2A as well as receives a variety of such data from the information processing device 2A that is installed at the first center and connected to the information processing device 2B via the network N (see FIG. 4).

The memory unit 23 is used to store computer programs, which are executed by the CPU of the control unit 20, and to store data. Moreover, the memory unit 23 is used to store the contents used for the purpose of displaying a variety of information, such as the common image P1 representing the conference material, on the primary display device H1 or on the secondary display device H2. Examples of the contents include the contents that are commonly used among a plurality of information processing devices installed at different centers for the purpose of displaying the common image P1, which represents the conference material, on the primary display device H1 or on the secondary display device H2. Meanwhile, the memory unit 23 is implemented using, for example, hard disk drive (HDD) or a solid state drive (SSD).

The operating unit 24 receives various operations from the participants U who are using the information processing device 2B. Herein, the operating unit 24 is implemented using, for example, a keyboard, a mouse, or a touch-sensitive panel.

The primary display device H1 and the secondary display device H2 are capable of displaying a variety of information, such as the captured image P2 and the common image P1, related to an electronic conference. More particularly, the primary display device H1 and the secondary display device H2 are capable of displaying the common image P1 and the captured image P3, which is obtained by the image capturing unit S of the information processing device 2A installed at the first center (and, particularly, which captures therein the participants U participating at the first center). Meanwhile, the primary display device H1 and the secondary display device H2 are implemented using, for example, liquid crystal displays.

In the first embodiment, as illustrated in FIG. 1, when seen from the participants U positioned in front of the information processing device 2 (in other words, when facing the display screens G of the display devices H), the primary display device H1 is placed on the left and the secondary display device H2 is placed on the right.

The image capturing unit S is installed to capture the image in front of the display screens G of the display devices H from around the display screens G. In the first embodiment, as illustrated in FIG. 1, the image capturing unit S is installed in front of the display screens G as a component separated from the display devices H. However, as long as the image capturing unit S captures the image in front of the display screens G from around the display screens G, the image capturing unit S can be integrated with the display devices H. Moreover, the image capturing unit S is implemented using, for example, a digital video camera that is rotatable, equipped with the zooming functionality, and capable of capturing live footage.

The microphone unit 28 collects the surrounding sounds. More particularly, the microphone unit 28 collects the sounds uttered by the participants U who are present in a space such as a conference room in which the information processing device including the microphone unit 28 is installed.

The speaker unit 29 outputs various sounds. More particularly, the speaker unit 29 outputs the sounds uttered by the participants U and collected by the microphone unit 28 of the information processing device 2A installed at the first center.

FIG. 4 is block diagram illustrating a functional configuration of each information processing device according to the first embodiment. As illustrated in FIG. 4, the CPU of the control unit 20 of the information processing device 2 loads the computer programs, which are stored in the ROM or the memory unit 23, in the RAM and executes them. As a result, the control unit 20 functions as an initial positional relationship determining unit 201, a positional relationship sending unit 202, a positional relationship receiving unit 203, a positional relationship determining unit 204, a positional relationship storing unit 205, a picture switching unit 206, a first output unit 207, a second output unit 208, a picture receiving unit 209, an information obtaining unit 210, and a camera display positional relationship obtaining unit 211. Herein, the following explanation is given about the functional configuration of the information processing device 2B installed at the second center. However, the information processing device 2A installed at the first center also has a similar functional configuration.

The initial positional relationship determining unit 201 functions as a setting unit that sets a common image position (an initial position) that represents the display position of the common image P1 with reference to the display position of the captured image P3 when facing the display screens G of the display devices H installed at the second center. Then, the initial positional relationship determining unit 201 stores the initial position in the positional relationship storing unit 205.

Herein, the initial position (the common image position) represents the display position of the common image P1 in the left and right direction with reference to the display position of the captured image P3 when facing the display screens G of the display devices H but prior to receiving the position information from the information processing device 2A installed at the first center. In the first embodiment, the initial position (the common image position) represents the information indicating the display screen among the primary display screen G1 of the primary display device H1 and the secondary display screen G2 of the secondary display device H2 on which the common image P1 is to be displayed and the captured image P3 is to be displayed. More particularly, the initial position (the common image position) represents either "on left of captured image" or "on right of captured image". Herein, "on left of captured image" indicates that the display position of the common image P1 is set to be on the left of the captured image P3 when facing the display screens G of the display devices H installed at the second center. In contrast, "on right of captured image" indicates that the display position of the common image P1 is set to be on the right of the captured image P3 when facing the display screens G of the display devices H installed at the second center.

Meanwhile, in each information processing device 2, the initial positional relationship determining unit 201 can set the initial position in an arbitrary manner. More particularly, consider a case in which the primary display screen G1 of the primary display device H1, which is installed on the left when facing the display screens G of the display devices H, is larger than the secondary display screen G2 of the secondary display device H2, which is installed on the right when facing the display screens G of the display devices H. In that case, it is more convenient to display the common image P1 on the primary display screen G1. Hence, the initial position is set to be "on left of captured image".

The positional relationship sending unit 202 receives a connection request issued with respect to the information processing device 2B from the information processing device 2A installed at the first center. Then, once communication is established with the information processing device 2A installed at the first center, the positional relationship sending unit 202 sends the position information, which is stored in the positional relationship storing unit 205, to the information processing device 2A that had issued the connection request.

At the time of issuing a connection request from the information processing device 2B installed at the second center to the information processing device 2A installed at the first center, the positional relationship receiving unit 203 issues the connection request to the information processing device 2A installed at the first center. Then, once communication is established with the information processing device 2A installed at the first center, the positional relationship receiving unit 203 receives the position information that is stored in the positional relationship storing unit 205 of the information processing device 2A installed at the first center.

Based on the position information received by the positional relationship receiving unit 203, the positional relationship determining unit 204 sets the common image position (in the first embodiment, "on left of captured image" or "on right of captured image") that represents the display position of the common image P1 in the left and right direction with reference to the display position of the captured image P3 when facing the display screens G of the display devices H installed at the second center; and updates the initial position with the common image position.

The positional relationship storing unit 205 holds the initial position (or the common image position), which is set by the initial positional relationship determining unit 201 or the positional relationship determining unit 204, by storing it in a predetermined memory area of a RAM or the like.

The picture switching unit 206 determines, based on the initial position (or the common image position) stored in the positional relationship storing unit 205, which of the common image P1 and the captured image P3 is to be displayed on the primary display device H1 and the secondary display device H2; and outputs the common image P1 and the captured image P3 to a picture output unit (the first output unit 207 and the second output unit 208) according to the determination result.

The first output unit 207 outputs an image that is input from the picture switching unit 206 (i.e., outputs the common image P1 or the captured image P3) to the primary display device H1. Accordingly, the primary display device H1 displays the image input thereto (i.e., the common image P1 or the captured image P3) on the primary display screen G1.

Similarly, the second output unit 208 outputs an image that is input from the picture switching unit 206 (i.e., outputs the common image P1 or the captured image P3) to the secondary display device H2. Accordingly, the secondary display device H2 displays the image input thereto (i.e., the common image P1 or the captured image P3) on the secondary display screen G2.

The picture receiving unit 209 receives the captured image P3 from the information processing device 2A installed at the first center via the network N.

The information obtaining unit 210 obtains the common image P1 from the information processing device 2A installed at the first center via the network N.

The camera display positional relationship obtaining unit 211 obtains the position information related to the display position of the common image P1 in the left and right direction with reference to the position of the image capturing unit S when facing the display screens G of the display devices H installed at the second center, and stores the position information in the positional relationship storing unit 205.

Figure 5:
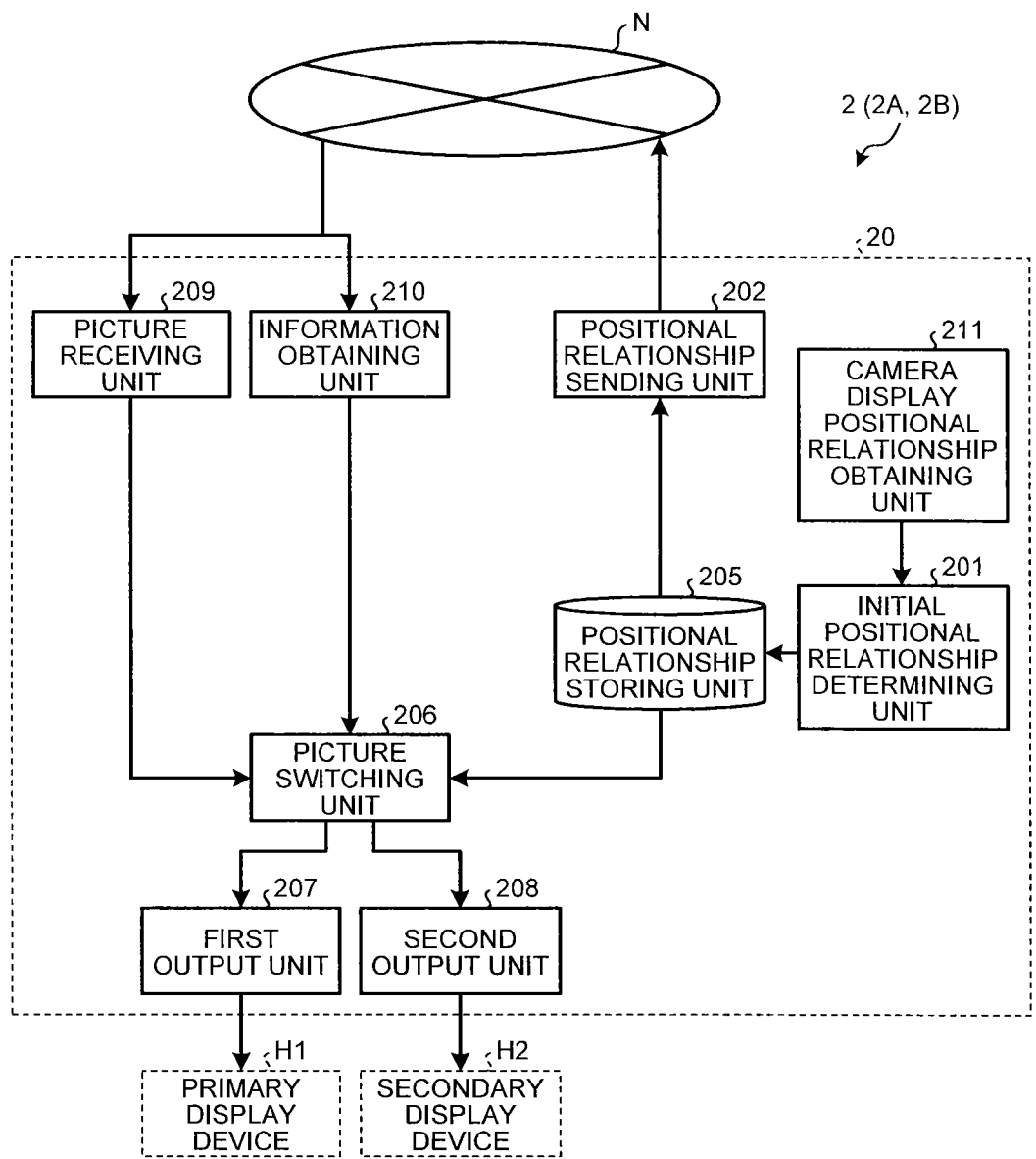
FIG. 5 is a block diagram illustrating a functional configuration of an information processing device that functions as a receiver of connection requests.
Figure 6:
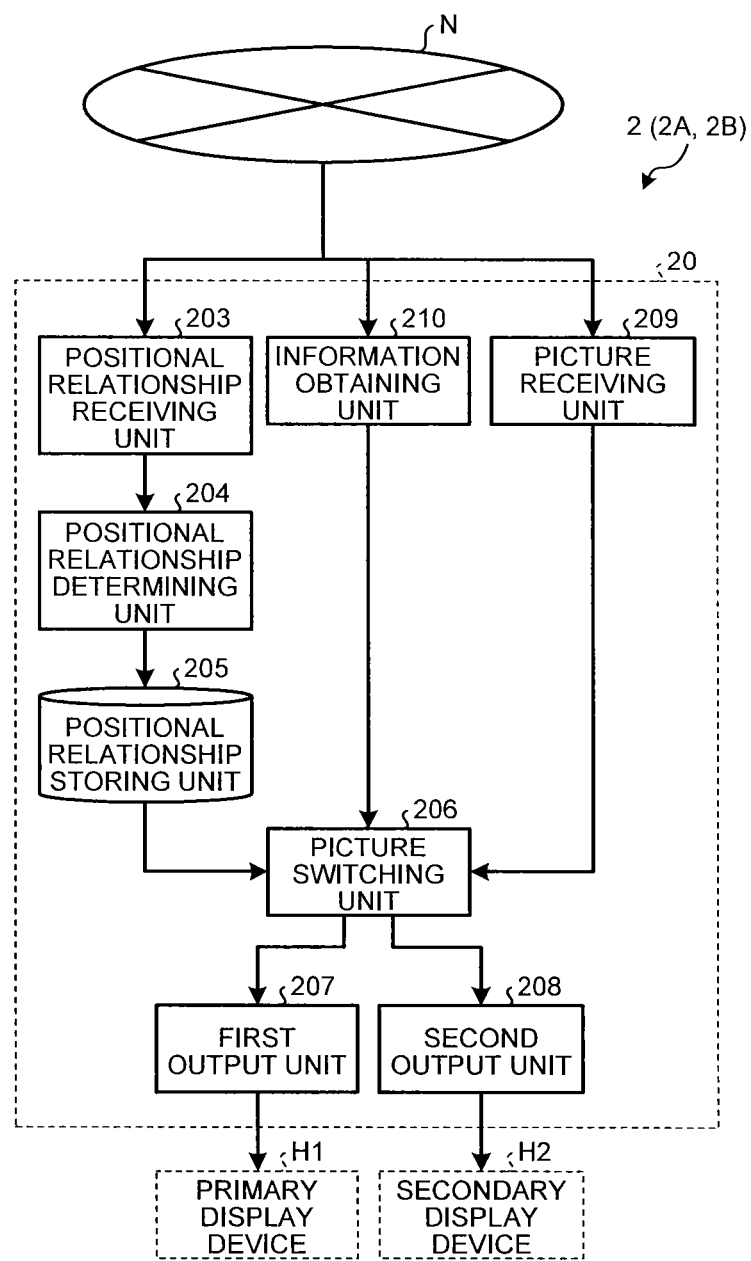
FIG. 6 is a block diagram illustrating a functional configuration of an information processing device that functions as a sender of connection requests.

In the first embodiment, in the display control system 1, the information processing device 2A installed at the first center and the information processing device 2B installed at the second center have a similar functional configuration so as to ensure that each of them functions as a receiver of connection requests as well as a sender of connection requests. However, it is not limited thereto. FIG. 5 is a block diagram illustrating a functional configuration of an information processing device that functions as a receiver of connection requests. FIG. 6 is a block diagram illustrating a functional configuration of an information processing device that functions as a sender of connection requests. For example, as illustrated in FIG. 5, the information processing device 2 functioning as a receiver of connection requests needs to include at least the initial positional relationship determining unit 201, the positional relationship sending unit 202, the positional relationship storing unit 205, the picture switching unit 206, the first output unit 207, the second output unit 208, the picture receiving unit 209, the information obtaining unit 210, and the camera display positional relationship obtaining unit 211. On the other hand, as illustrated in FIG. 6, the information processing device 2 functioning as a sender of connection requests needs to include at least the positional relationship receiving unit 203, the positional relationship determining unit 204, the positional relationship storing unit 205, the picture switching unit 206, the first output unit 207, the second output unit 208, the picture receiving unit 209, and the information obtaining unit 210.

Explained below with reference to FIG. 7 is an image display operation performed in the information processing devices 2 according to the first embodiment. FIG. 7 is a flowchart for explaining a sequence of operations during the image display operation performed in the information processing devices according to the first embodiment. The following explanation is given for a case in which the image display operation is performed when the information processing device 2B installed at the second center issues a connection request to the information processing device 2A installed at the first center. However, also in the case when the information processing device 2A installed at the first center issues a connection request to the information processing device 2B installed at the second center, the image display operation is performed in a similar manner.

As illustrated in FIG. 7, when the information processing device 2A installed at the first center and the information processing device 2B installed at the second center are started up (Step S701 and Step S702), the initial positional relationship determining unit 201 in each information processing device 2 sets the initial position (to be, for example, "on left of image capturing unit") and stores the initial position in the corresponding positional relationship storing unit 205 (Step S703 and Step S704).

Then, based on the initial position stored in each positional relationship storing unit 205; the corresponding picture switching unit 206 displays the common image P1, which is obtained by the corresponding information obtaining unit 210, and the captured image P2, which is obtained by the corresponding picture receiving unit 209, side-by-side in the left and right direction. In the first embodiment, as described above, the picture switching unit 206 installed at each center determines, based on the corresponding initial position, which of the common image P1 and the captured image P2 is to be displayed on the primary display device H1 and on the secondary display device H2; and outputs the common image P1 and the captured image P2 to the picture output unit (the first output unit 207 and the second output unit 208) according to the determination result. As a result, at each center, the common image P1 and the captured image P2 are displayed side-by-side in the left and right direction when facing the display screens G.

For example, when the initial position at the first center is set to be "on left of captured image", the corresponding picture switching unit 206 outputs the common image P1 to the first output unit 207 for displaying it on the primary display screen G1 and outputs the captured image P2 to the second output unit 208 for displaying it on the secondary display screen G2. As a result, when facing the display screens G installed at the first center, the common image P1 is displayed on the left of the captured image P2. In a similar manner to the picture switching unit 106 installed at the first center, the picture switching unit 106 installed at the second center also displays the common image P1 and the captured image P3 side-by-side in the left and right direction when facing the display screens G installed at the second center.

Then, the camera display positional relationship obtaining unit 211 of the information processing device 2 installed at each center obtains the position information that indicates the display position of the common image P1 in the left and right direction with reference to the position of the corresponding image capturing unit S when facing the display screens G of the corresponding display devices H (Step S705 and Step S706).

Herein, the explanation is given about a position information obtaining method implemented by the camera display positional relationship obtaining unit 211 according to the first embodiment. FIG. 8 is a diagram for explaining the position information obtaining method implemented by the camera display positional relationship obtaining unit 211 according to the first embodiment. The camera display positional relationship obtaining unit 211 displays a predetermined pattern image at the display position of the common image P1 set based on the initial position (for example, displays a predetermined pattern image on the primary display screen G1 of the primary display H1). Then, the camera display positional relationship obtaining unit 211 rotates the image capturing unit S to enable the image capturing unit S to capture an image of the display screens G; and, with reference to the center of a display screen image that is obtained by the image capturing unit S by capturing the display screens G, specifies whether the pattern image included in the display screen image is positioned on the left or on the right. Then, the camera display positional relationship obtaining unit 211 sets the specified position to be the position of the common image P1 in the left and right direction with reference to the position of the image capturing unit S when facing the display screens G.

In the first embodiment, the camera display positional relationship obtaining unit 211 makes use of the display screen image in which the pattern image displayed on the display screens G is captured, and obtains the position information indicating the position of the common image P1 in the left and right direction. However, it is not limited thereto. Alternatively, for example, an operator (a participant U) of the information processing device 2 can input, via the operating unit 24, the position of the common image P1 in the left and right direction with reference to the position of the image capturing unit S when facing the display screens G; and the camera display positional relationship obtaining unit 211 can obtain the input position as the position information.

Returning to the explanation with reference to FIG. 8, according to a connection request operation performed by a participant U participating at the second center, the information processing device 2B installed at the second center sends a connection request to the information processing device 2A installed at the first center (Step S707). If a participant U operates the information processing device 2B installed at the second center and sets the common image P1 to be displayed on a display device H installed at the first center as well as a display device H installed at the second center; then the information processing device 2B includes the common image P1 in the connection request before sending the connection request to the information processing device 2A installed at the first center.

When the information processing device 2A installed at the first center receives the connection request (Step S708), the positional relationship sending unit 202 installed at the first center sends the position information (for example, "on left of image capturing unit"), which is stored in the positional relationship storing unit 205, to the information processing device 2B installed at the second center (Step S709).

The positional relationship receiving unit 203 of the information processing device 2B receives the position information sent by the information processing device 2A installed at the first center (Step S710). Subsequently, based on the received position information (for example, "on left of image capturing unit"), the positional relationship determining unit 204 installed at the second center sets the common image position (for example, "on right of image capturing unit") that represents the display position of the common image P1 in the left and right direction with reference to the display position of the captured image P3 when facing the display screens G of the display devices H installed at the second center; and updates the initial position with the common image position (Step S711). Meanwhile, regarding the operation by which the positional relationship determining unit 204 sets the common image position, the details are described later.

FIG. 9 is a diagram illustrating an example of the position information and the common image position stored in the positional relationship storing unit of each information processing device according to the first embodiment. As illustrated in FIG. 9, the positional relationship storing unit 205 of the information processing device 2B installed at the second center stores the position information and the common image position received by the positional relationship receiving unit 203.

When the position information is set to be "on left of image capturing unit", it indicates that the display position of the common image P1 is set to be on the left of the position of the image capturing unit S when facing the display screens G of the display devices H installed at the first center. In contrast, when the position information is set to be "on right of image capturing unit", it indicates that the display position of the common image P1 is set to be on the right of the position of the image capturing unit S when facing the display screens G of the display devices H installed at the first center. However, when the position information is set to be "neither on left nor on right", it indicates that it is not possible to identify the display position of the common image P1 in the left and right direction with reference to the image capturing unit S when facing the display screens G of the display devices H installed at the first center.

Meanwhile, when the common image position represents "on left of captured image", it indicates that the display position of the common image P1 is set to be on the left of the display position of the captured image P3 when facing the display screens G of the display devices H installed at the second center. In contrast, when the common image position represents "on right of captured image", it indicates that the display position of the common image P1 is set to be on the right of the display position of the captured image P3 when facing the display screens G of the display devices H installed at the second center.

Returning to the explanation with reference to FIG. 7, once the initial position is updated, the picture switching unit 206 displays the common image P1 and the captured image P3, which is received by the picture receiving unit 209, side-by-side in the left and right direction on the display screens G based on the common image position stored in the positional relationship storing unit 205. In the first embodiment, as described above, based on the common image position, the picture switching unit 206 determines which of the common image P1 and the captured image P3 is to be displayed on the primary display device H1 and the secondary display device H2; and outputs the common image P1 and the captured image P3 to the picture output unit (the first output unit 207 and the second output unit 208) according to the determination result. As a result, the common image P1 and the captured image P3 are displayed side-by-side in the left and right direction when facing the display screens G installed at the second center.

For example, when the common image position represents "on right of captured image", the picture switching unit 206 installed at the second center outputs the common image P1 to the second output unit 208 for displaying it on the secondary display screen G2 and outputs the captured image P3 to the first output unit 207 for displaying it on the primary display screen G1. As a result, when facing the display screens G installed at the second center, the common image P1 is displayed on the right of the captured image P3.

Explained below with reference to FIGS. 10 to 14 are the details of the operation by which the positional relationship determining unit 204 sets the common image position. FIG. 10 is a flowchart for explaining a sequence of operations during the operation by which the positional relationship determining unit 204 sets the common image position. FIGS. 11 to 14 are diagrams for explaining the display positions of the common image and the captured image in the information processing devices according to the first embodiment. The following explanation is given about the operation by which the positional relationship determining unit 204 of the information processing device 2B installed at the second center sets the common image position. However, the positional relationship determining unit 204 of the information processing device 2A installed at the first center also sets the common image position by performing a similar operation.

The positional relationship determining unit 204 of the information processing device 2B installed at the second center obtains the position information received by the positional relationship receiving unit 203 (Step S1001). Then, the positional relationship determining unit 204 determines whether or not the obtained position information is set to be "on right of image capturing unit" (i.e., whether or not the position of the common image P1 in the left and right direction with reference to the position of the image capturing unit S when facing the display screens G of the display devices H installed at the first center is on the right of the position of the image capturing unit S) (Step S1002).

Figure 11:
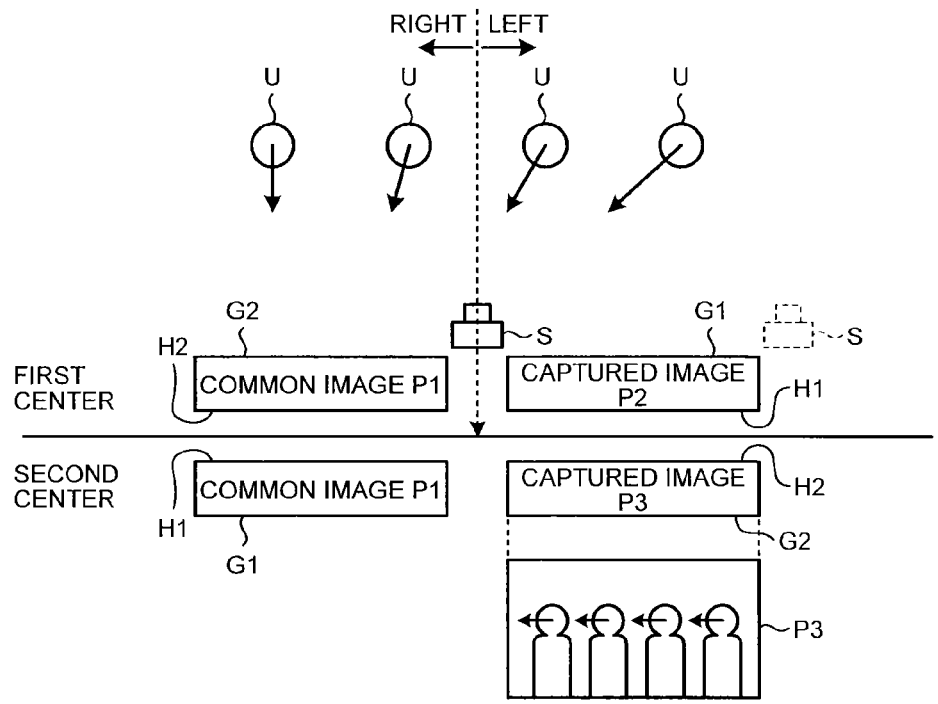
FIGS. 11 to 14 are diagrams for explaining the display positions of the common image and the captured image in the information processing devices according to the first embodiment.

If the position information is set to be "on right of image capturing unit" (Yes at Step S1002), then the positional relationship determining unit 204 sets "on left of captured image" to be the common image position (Step S1003). More particularly, when the position information is set to be "on right of image capturing unit", the display position of the common image P1 at the first center is on the right of the position of the image capturing unit S when facing the primary display screen G1 and the secondary display screen G2 as illustrated in FIG. 11. Then, the participants U participating at the first center have their lines of sight directed toward the right of the position of the image capturing unit S when facing the primary display screen G1 and the secondary display screen G2. For that reason, the captured image P3 that is obtained by the image capturing unit S installed at the first center includes the participants U looking left as illustrated in FIG. 11.

In this case, the positional relationship determining unit 204 installed at the second center sets "on left of captured image" to be the display position of the common image P1 (i.e., to be the common image position) with reference to the display position of the captured image P3 when facing the primary display screen G1 and the secondary display screen G2. As a result, as illustrated in FIG. 11, the picture switching unit 206 installed at the second center outputs the common image P1 to the first output unit 207 for displaying it on the primary display screen G1 and outputs the captured image P3 to the second output unit 208 for displaying it on the secondary display screen G2.

Thus, the positional relationship determining unit 204 and the picture switching unit 206 installed at the second center display the common image P1 and the captured image P3 on the display devices H at the second center in such a way that, as illustrated in FIG. 11, the display position of the common image P1 in the left and right direction with reference to the display position of the captured image P3 when facing the display devices H (the primary display device H1 and the secondary display device H2) installed at the second center is on the opposite side of the display position of the common image P1 in the left and right direction with reference to the position of the image capturing unit S when facing the display screens G (the primary display screen G1 and the secondary display screen G2) of the display devices H (the primary display device H1 and the secondary display device H2) installed at the first center. In the first embodiment, the positional relationship determining unit 204 and the picture switching unit 206 function as a display control unit.

As a result, the common image P1, which is displayed on the primary display screen G1 of the primary display device H1 installed at the second center, is present in the direction (the leftward direction) of the lines of sight of the participants U captured in the captured image P3, which is displayed on the secondary display screen G2 of the secondary display device H2 installed at the second center. For that reason, at the time of displaying the common image P1 and the captured image P3 on the display screens G (the primary display screen G1 and the secondary display screen G2), it becomes possible to prevent a situation in which the lines of sight of the persons captured in the captured image P3 appear unnatural.

Figure 12:
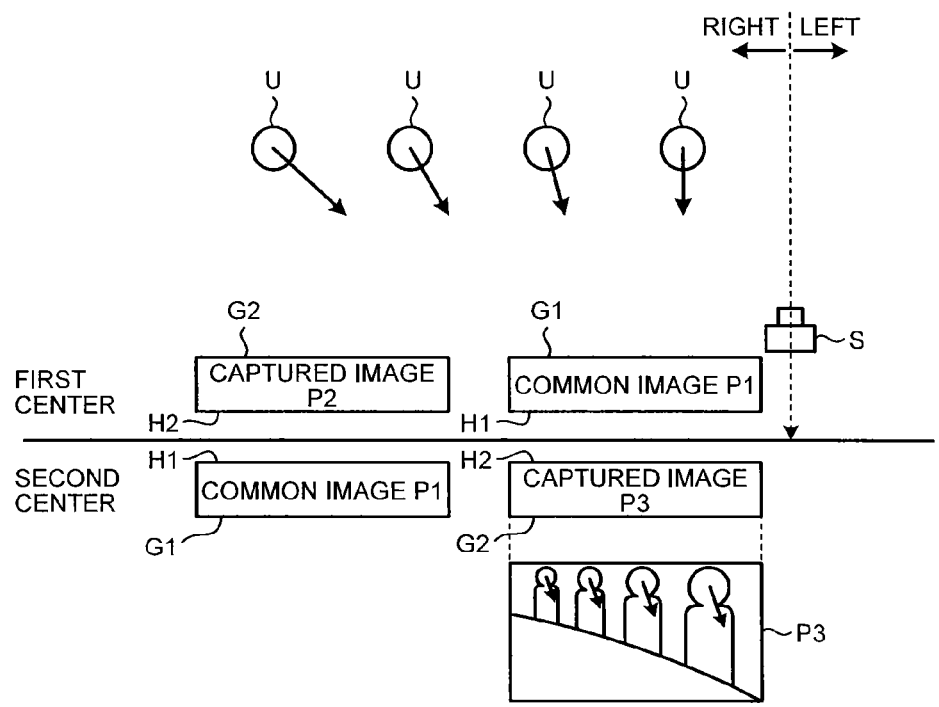

Meanwhile, even in the case when the obtained position information is set to be "on right of image capturing unit", if the display position of the common image P1, the display position of the captured image P2, and the position of the image capturing unit S at the first center have the positional relationship as illustrated in FIG. 12; then the participants U participating at the first center have their lines of sight directed left toward the position of the image capturing unit S when facing the primary display screen G1 and the secondary display screen G2. In that case, the participants U participating at the first center have their lines of sight directed toward the image capturing unit S installed at the first center; and the captured image P3 obtained by the image capturing unit S includes the participants U facing the front as illustrated in FIG. 12.

For that reason, the positional relationship determining unit 204 installed at the second center sets "on left of captured image" to be the display position of the common image P1 (i.e., to be the common image position) with reference to the display position of the captured image P3 when facing the primary display screen G1 and the secondary display screen G2 installed at the second center. Thus, as illustrated in FIG. 12, even in the case when the common image P1 is displayed on the primary display screen G1 and the captured image P3 is displayed on the secondary display screen G2; since the participants U captured in the captured image P3 have their lines of sight directed toward the front, it becomes possible to prevent a situation in which the lines of sight of the persons captured in the captured image P3 appear unnatural in terms of the relationship with the display position of the common image P1.

Figure 13:
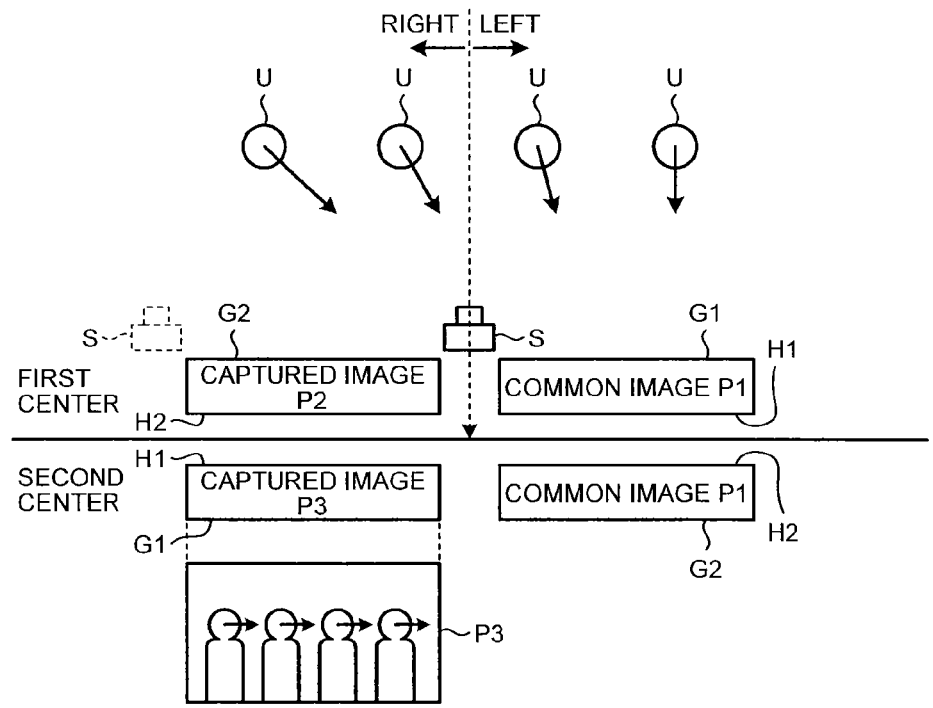

Meanwhile, if the obtained position information is set to be "on left of image capturing unit" (No at Step S1002), then the positional relationship determining unit 204 sets the common image position to be "on right of captured image" (Step S1004). More particularly, when the obtained position information is set to be "on left of image capturing unit", the display position of the common image P1 at the first center is on the left of the position of the image capturing unit S when facing the primary display screen G1 and the secondary display screen G2 as illustrated in FIG. 13. Then, the participants U participating at the first center have their lines of sight directed toward the left of the position of the image capturing unit S when facing the primary display screen G1 and the secondary display screen G2. For that reason, the captured image P3 that is obtained by the image capturing unit S installed at the first center includes the participants U facing left.

In this case, the positional relationship determining unit 204 installed at the second center sets "on right of captured image" to be the display position of the common image P1 (i.e., to be the common image position) with reference to the display position of the captured image P3 when facing the primary display screen G1 and the second display screen G2 installed at the second center. As a result, as illustrated in FIG. 13, the picture switching unit 206 installed at the second center outputs the common image P1 to the second output unit 208 for displaying it on the secondary display screen G2 and outputs the captured image P3 to the first output unit 207 for displaying it on the primary display screen G1.

Thus, the positional relationship determining unit 204 and the picture switching unit 206 installed at the second center display the common image P1 and the captured image P3 on the display devices H at the second center in such a way that, as illustrated in FIG. 13, the display position of the common image P1 in the left and right direction with reference to the display position of the captured image P3 when facing the display devices H (the primary display device H1 and the secondary display device H2) installed at the second center is on the opposite side of the display position of the common image P1 in the left and right direction with reference to the position of the image capturing unit S when facing the display screens G (the primary display screen G1 and the secondary display screen G2) of the display devices H (the primary display device H1 and the secondary display device H2) installed at the first center.

As a result, the common image P1, which is displayed on the secondary display screen G2 of the secondary display device H2 installed at the second center, is present in the direction (the rightward direction) of the lines of sight of the participants U captured in the captured image P3, which is displayed on the primary display screen G1 of the primary display device H1 installed at the second center. For that reason, at the time of displaying the common image P1 and the captured image P3 on the display screens G (the primary display screen G1 and the secondary display screen G2), it becomes possible to prevent a situation in which the lines of sight of the persons captured in the captured image P3 appear unnatural.

Figure 14:
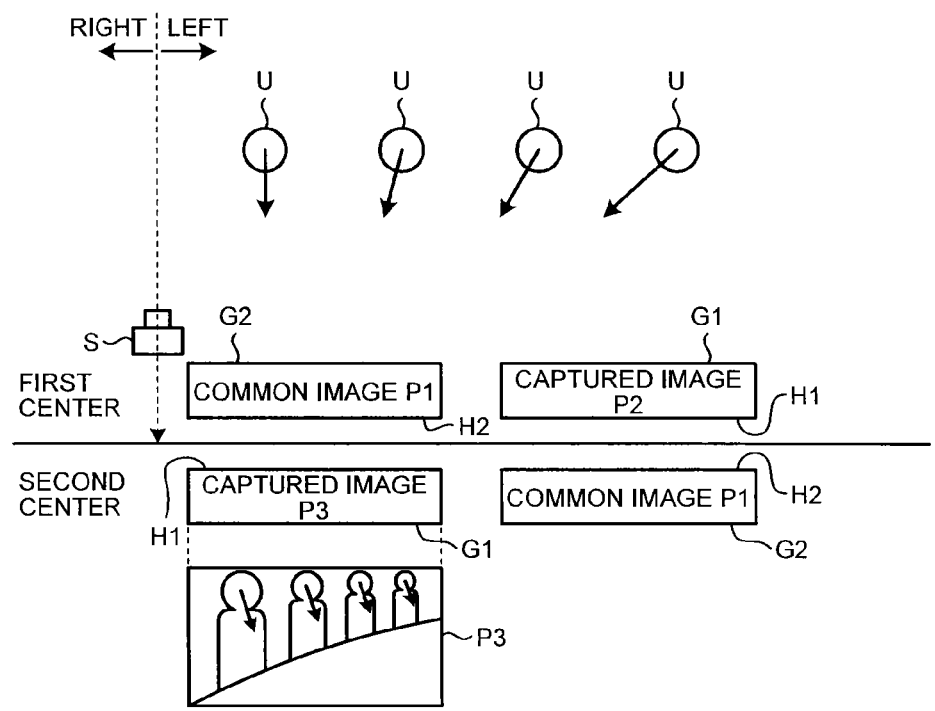

Meanwhile, even in the case when the obtained position information is set to be "on left of image capturing unit", if the display position of the common image P1, the display position of the captured image P2, and the position of the image capturing unit S at the first center have the positional relationship as illustrated in FIG. 14; the participants U participating at the first center have their lines of sight directed right toward the position of the image capturing unit S when facing the primary display screen G1 and the secondary display screen G2. In that case, the lines of sight of the participants U at the first center are directed toward the image capturing unit S installed at the first center; and the captured image P3 obtained by the image capturing unit S includes the participants U facing the front as illustrated in FIG. 14.

For that reason, the positional relationship determining unit 204 installed at the second center sets "on right of captured image" to be the display position of the common image P1 (i.e., to be the common image position) with reference to the display position of the captured image P3 when facing the primary display screen G1 and the secondary display screen G2 installed at the second center. Thus, as illustrated in FIG. 14, even in the case when the common image P1 is displayed on the secondary display screen G2 and the captured image P3 is displayed on the primary display screen G1; since the participants U captured in the captured image P3 have their lines of sight directed toward the front, it becomes possible to prevent a situation in which the lines of sight of the persons captured in the captured image P3 appear unnatural in terms of the relationship with the display position of the common image P1.

In this way, in the display control system 1 according to the first embodiment, the common image P1 and the captured image P3 are displayed on the display devices H at the second center in such a way that the display position of the common image P1 in the left and right direction with reference to the display position of the captured image P3 when facing the display devices H installed at the second center is on the opposite side of the display position of the common image P1 in the left and right direction with reference to the position of the image capturing unit S when facing the display screens G of the display devices H installed at the first center. Hence, at the time of displaying the captured image P3 and the common image P1 side-by-side in the left and right direction when facing the display devices H installed at the second center, the participants U captured in the captured image P3 can be displayed in such a way that they appear to be viewing the common image P1 and taking interest in the conference. As a result, it becomes possible to smoothly create an atmosphere in which the participants U have a conversation while paying attention to the common image P1. Thus, according to the first embodiment, at the time of displaying the captured image P3 and the common image P1 side-by-side in the left and right direction when facing the display devices H installed at the second center, it becomes possible to prevent a situation in which the lines of sight of the participants U captured in the captured image P3 appear unnatural.

Second Embodiment

In a second embodiment, the explanation is given for an example in which a common image and a captured image, which is obtained by an image capturing unit by capturing the image in front of a display screen of another display device capable of displaying the common image from around that display screen, are displayed on a single screen of a display device that is installed at a different location than the location of the abovementioned other display device. However, in the following explanation, the contents identical to the first embodiment are not explained again.

Figure 15:
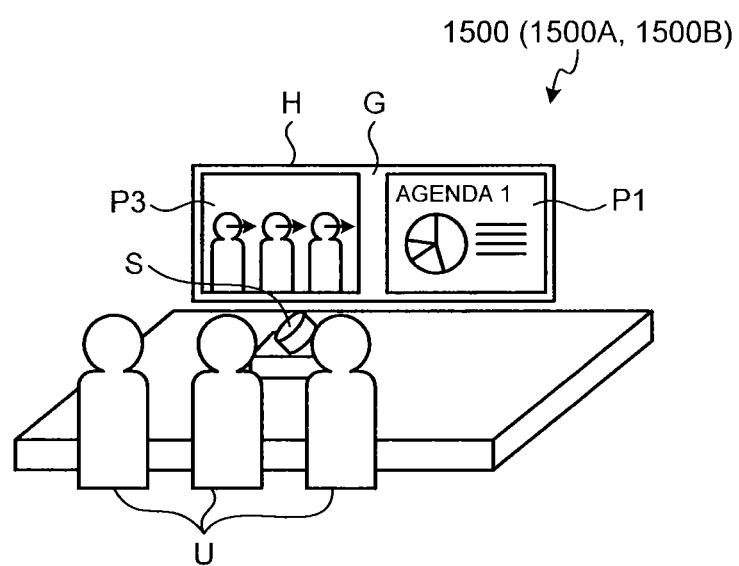
FIG. 15 is a diagram illustrating a configuration of an information processing device according to a second embodiment.

FIG. 15 is a diagram illustrating a configuration of an information processing device according to the second embodiment. An information processing device 1500 according to a second embodiment includes a single display device H. Thus, the common image P1 and the captured image P2 (or the captured image P3) are displayed on only a single screen (the display screen G). In the second embodiment, the information processing device 1500 arranges the common image P1 and the captured image P2 (or the captured image P3) side-by-side in the left and right direction and synthesizes them to generate a single image (hereinafter, called a "composite image"), and displays the composite image on the display screen G.

Figure 16:
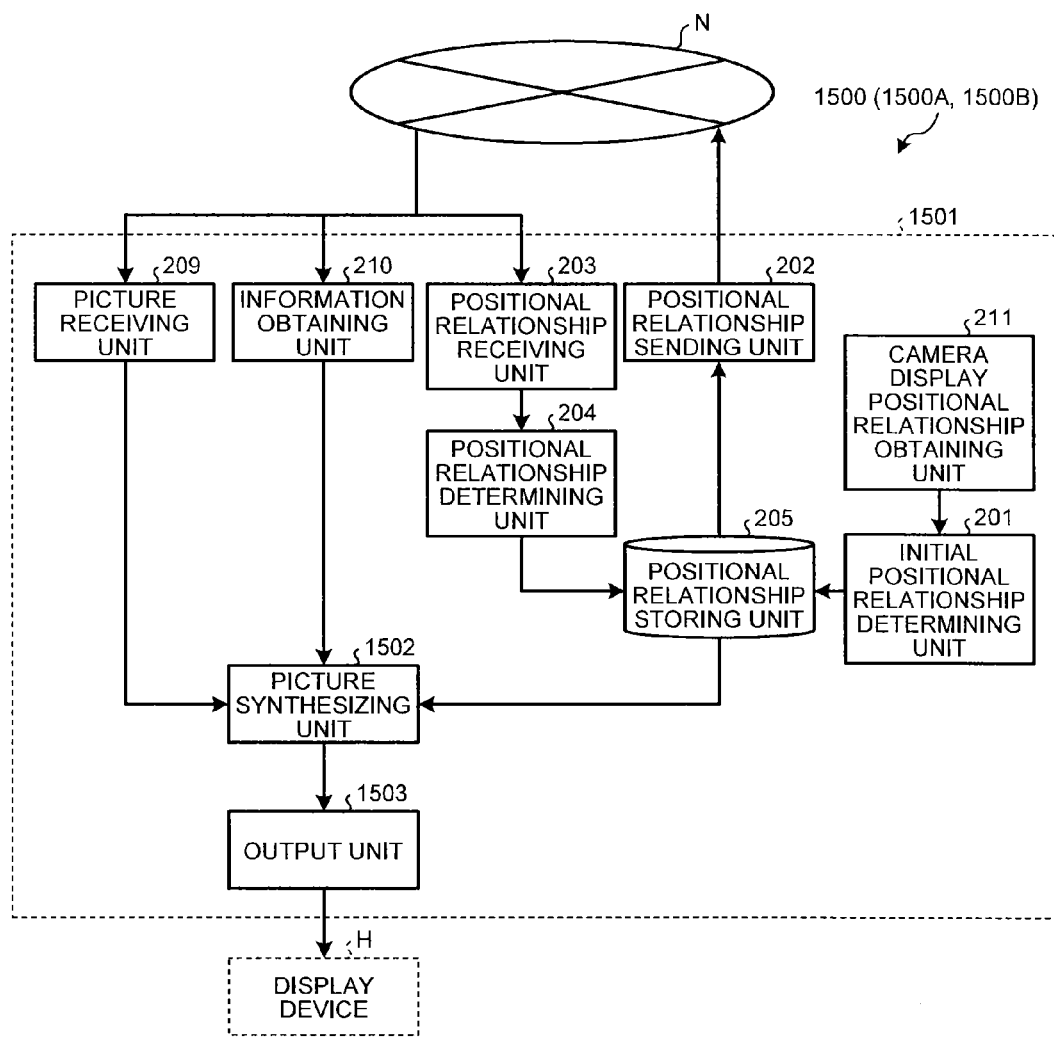
FIG. 16 is a block diagram illustrating a functional configuration of the information processing devices according to the second embodiment.

FIG. 16 is a block diagram illustrating a functional configuration of each information processing device according to the second embodiment. As illustrated in FIG. 16, a control unit 1501 of the information processing device 1500 functions as the initial positional relationship determining unit 201, the positional relationship sending unit 202, the positional relationship receiving unit 203, the positional relationship determining unit 204, the positional relationship storing unit 205, the picture receiving unit 209, the information obtaining unit 210, the camera display positional relationship obtaining unit 211, a picture synthesizing unit 1502, and an output unit 1503. The following explanation is given about the functional configuration of an information processing device 1500A installed at the first center. However, an information processing device 1500B installed at the second center also has a similar functional configuration.

The picture synthesizing unit 1502 determines, based on the initial position (or the common image position) stored in the positional relationship storing unit 205, whether to set the display position of the common image P1 on the left or on the right of the display position of the captured image P3 when facing the display screen G of the display device H. For example, if the initial position (or the common image position) is set to be "on left of captured image", then the picture synthesizing unit 1502 determines that the display position of the common image P1 is on the left of the display position of the captured image P3 when facing the display screen G. On the other hand, if the initial position or the common image position represents "on right of captured image", then the picture synthesizing unit 1502 determines that the display position of the common image P1 is on the right of the display position of the captured image P3 when facing the display screen G.

Then, based on the determination result, the picture synthesizing unit 1502 generates a composite image by performing image synthesis such that the common image P1 and the captured image P3 are arranged side-by-side in the left and right direction, and outputs the composite image to the output unit 1503.

The output unit 1503 outputs the composite image, which is generated by the picture synthesizing unit 1502, to the display device H so as to display the composite image on the display screen G.

Figure 17:
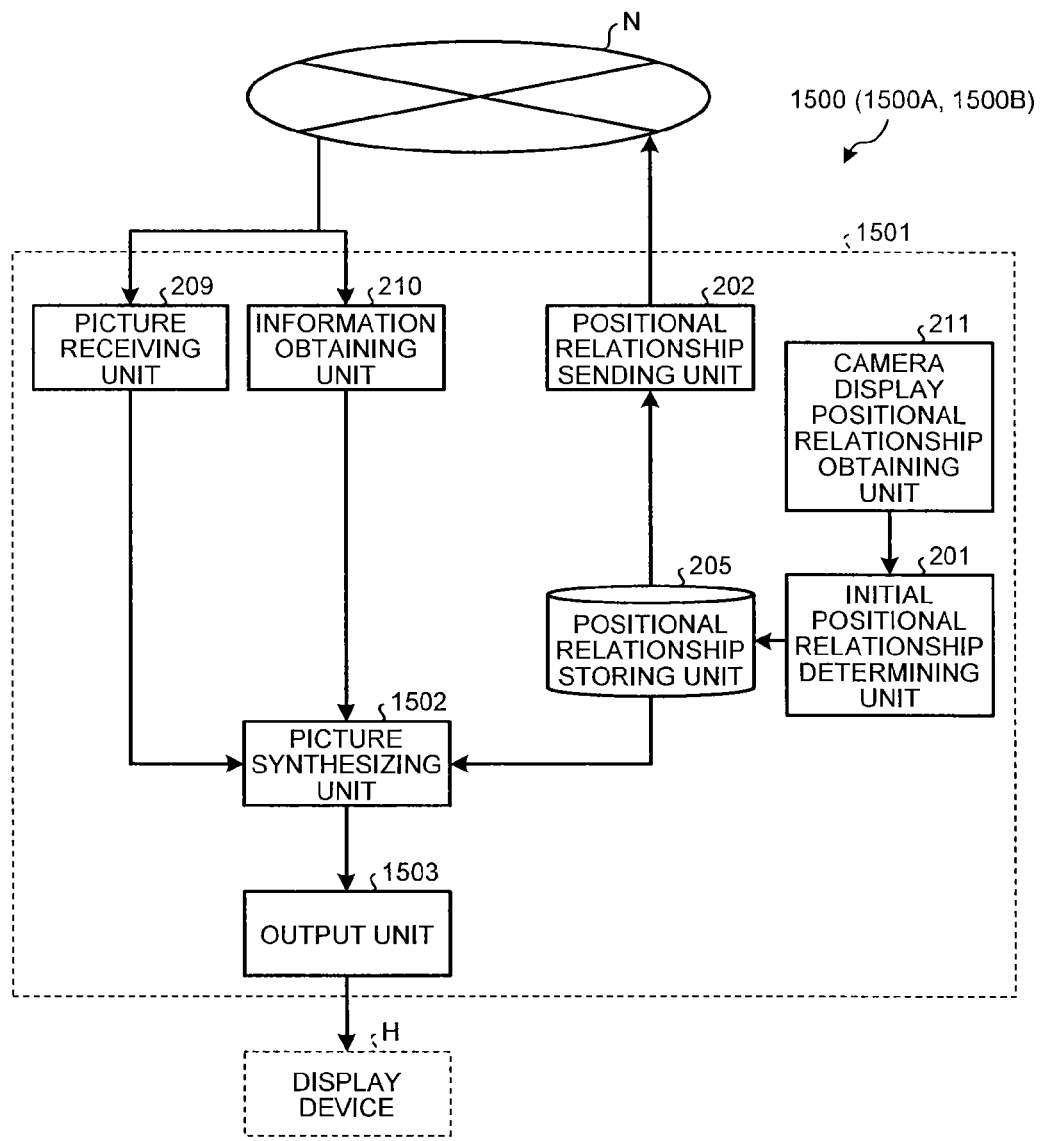
FIG. 17 is a block diagram illustrating a functional configuration of an information processing device that functions as a receiver of connection requests.
Figure 18:
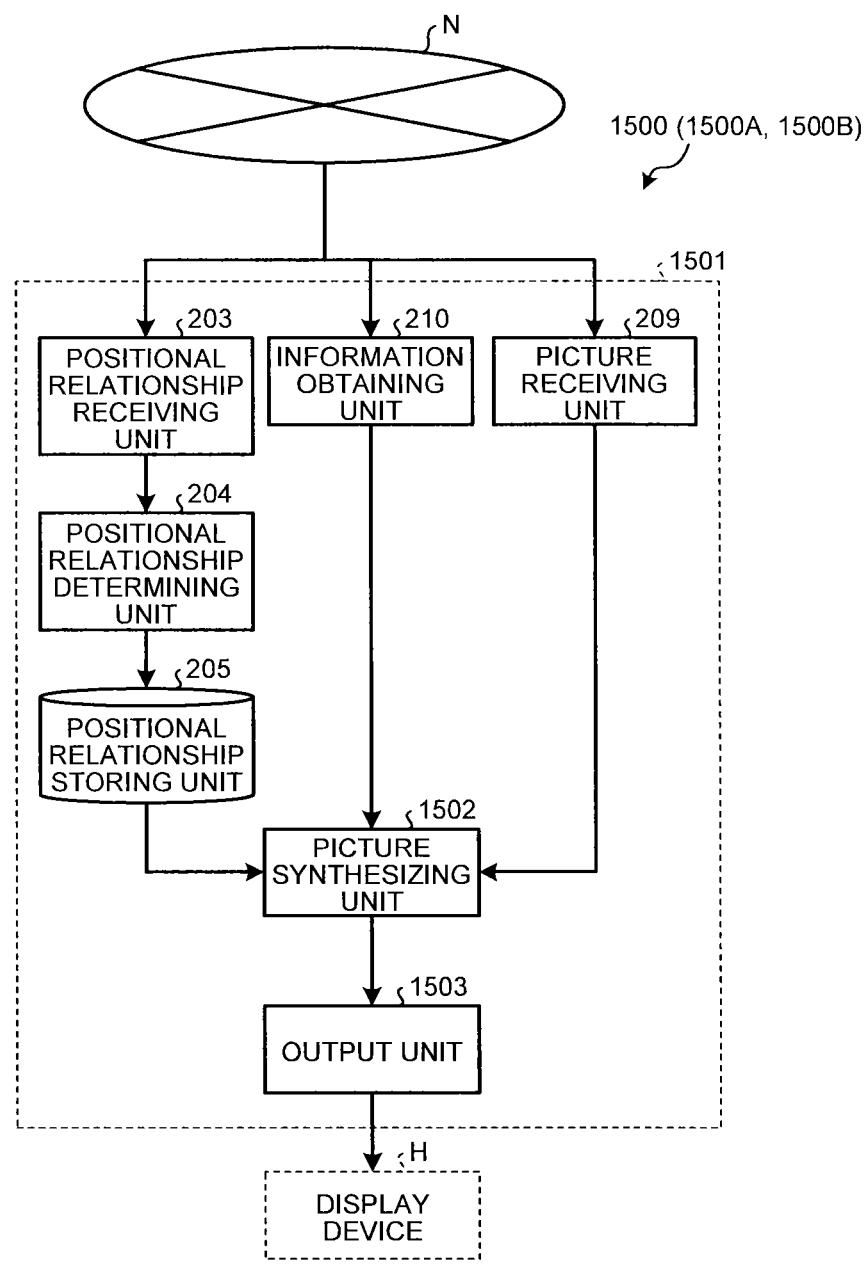
FIG. 18 is a block diagram illustrating a functional configuration of an information processing device that functions as a sender of connection requests.

In the second embodiment, the information processing device 1500A installed at the first center as well as the information processing device 1500B installed at the second center has a similar functional configuration so as to ensure that each of them functions as a receiver of connection requests as well as a sender of connection requests. However, it is not limited thereto. FIG. 17 is a block diagram illustrating a functional configuration of the information processing device that functions as a receiver of connection requests. FIG. 18 is a block diagram illustrating a functional configuration of the information processing device that functions as a sender of connection requests. For example, as illustrated in FIG. 17, as long as the information processing device 1500 functioning as a receiver of connection requests includes at least the initial positional relationship determining unit 201, the positional relationship sending unit 202, the positional relationship storing unit 205, the picture receiving unit 209, the information obtaining unit 210, the camera display positional relationship obtaining unit 211, the picture synthesizing unit 1502, and the output unit 1503; it serves the purpose. On the other hand, for example, as illustrated in FIG. 18, as long as the information processing device 1500 functioning as a sender of connection requests includes at least the positional relationship receiving unit 203, the positional relationship determining unit 204, the positional relationship storing unit 205, the picture receiving unit 209, the information obtaining unit 210, the picture synthesizing unit 1502, and the output unit 1503; it serves the purpose.

In this way, in the information processing device 1500 according to the second embodiment, the common image P1 and the captured image P2 (or the captured image P3) are displayed on a single screen. That eliminates the need for installing a plurality of display devices H at each center, thereby enabling achieving reduction in the cost related to the information processing devices 1500.

First Modification Example

In the first and second embodiments, the explanation is given for an example in which a common image and a captured image, which is captured at another center, are displayed side-by-side in the left and right direction. Alternatively, it is possible to have a case in which a common image and a plurality of captured images, which is captured at a plurality of other centers, are displayed on the display device of the concerned information processing device. In the following explanation, the contents identical to the second embodiment are not explained again.

When a connection request is issued from the information processing device 1500B installed at the second center to the information processing device 1500A installed at the first center and to an information processing device (not illustrated) installed at a third center; the positional relationship receiving unit 203 installed at the second center receives the position information sent from the information processing device 1500A installed at the first center and the information processing device (not illustrated) installed at the third center.

Then, based on the position information received from each center, the positional relationship determining unit 204 installed at the second center sets the common image position for each center and updates the initial position for each center stored in the positional relationship storing unit 205 with the common image position for each center. In the first modification example, the initial positional relationship determining unit 201 sets the initial position for each center, and stores the initial positions in the positional relationship storing unit 205.

The picture synthesizing unit 1502 displays, on the display screen G, the common image P1 and captured images P3 and P4, which are received by the picture receiving unit 209, side-by-side in the left and right direction based on the common image position for each center stored in the positional relationship storing unit 205. In the first modification example, based on the common image position for each center, the picture synthesizing unit 1502 determines whether the display position of the common image P1 is on the right or on the left of the display positions of the captured images P3 and P4 when facing the display screen G. Then, based on the determination result, the picture synthesizing unit 1502 generates a composite image by performing image synthesis such that the common image P1 and the captured images P3 and P4 are arranged side-by-side in the left and right direction, and outputs the composite image to the output unit 1503.

Figure 19:
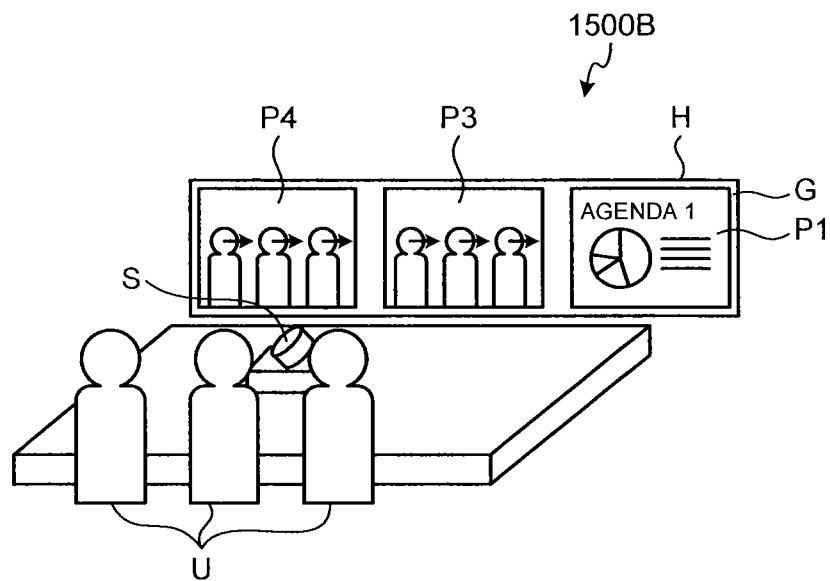
FIGS. 19 to 21 are diagrams illustrating display examples of a common image and a plurality of captured images in the information processing device according to a first modification example.
Figure 20:
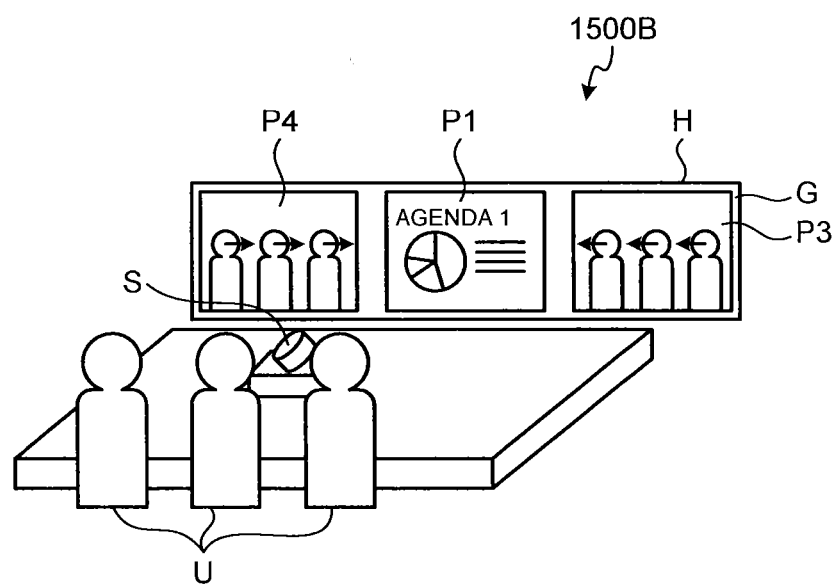
Figure 21:
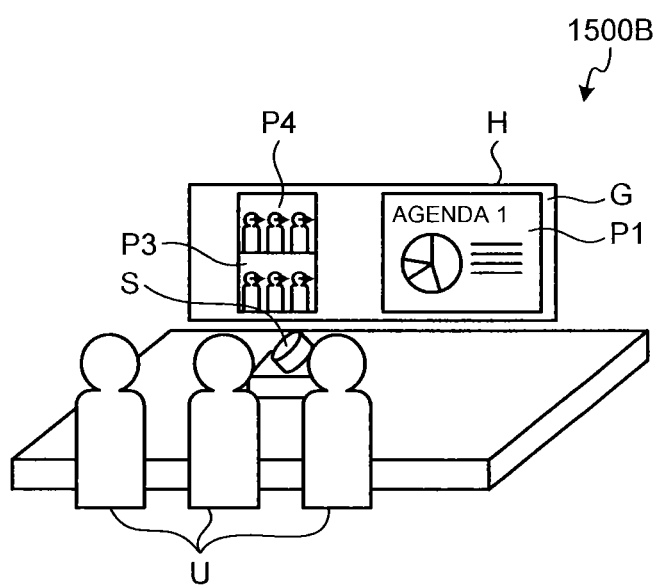

FIGS. 19 to 21 are diagrams illustrating display examples of a common image and a plurality of captured images in the information processing device according to the first modification example. For example, if the common image position for the first center as well as the common image position for the third center is set to be "on right of captured image", then the picture synthesizing unit 1502 determines that the display position of the common image P1 is on the right of the display positions of the captured images P3 and P4 when facing the display screen G. Then, the picture synthesizing unit 1502 generates a composite image in which the display position of the common image P1 is on the right of the display positions of the captured images P3 and P4 and in which the captured images P3 and P4 are arranged side-by-side in the left and right direction. Subsequently, the picture synthesizing unit 1502 outputs the composite image to the output unit 1503. As a result, as illustrated in FIG. 19, the picture synthesizing unit 1502 displays the common image P1 and the captured images P3 and P4 on the display screen G in such a way that the display position of the common image P1 is on the right of the display positions of the captured images P3 and P4 when facing the display screen G as well as the display positions of the captured images P3 and P4 are arranged side-by-side in the left and right direction.

If the common image position for the first center is set to be "on left of captured image" and the common image position for the third center is set to be "on right of captured image", then the picture synthesizing unit 1502 determines that the display position of the common image P1 is on the right of the display position of the captured image P3 but on the left of the display position of the captured image P4 when facing the display screen G. Then, the picture synthesizing unit 1502 generates a composite image in which the display position of the common image P1 is on the left of the display position of the captured image P3 but on the right of the display position of the captured image P4. Subsequently, the picture synthesizing unit 1502 outputs the composite image to the output unit 1503. As a result, as illustrated in FIG. 20, the picture synthesizing unit 1502 displays the common image P1 and the captured images P3 and P4 on the display screen G in such a way that the display position of the common image P1 is on the left of the display position of the captured image P3 but on the right of the display position of the captured image P4 when facing the display screen G.

If the common image position for the first center as well as the common image position for the third center is set to be "on right of captured image", then the picture synthesizing unit 1502 determines that the display position of the common image P1 is on the right of the display positions of the captured images P3 and P4 when facing the display screen G. Then, the picture synthesizing unit 1502 generates a composite image in which the display position of the common image P1 is on the right of the display positions of the captured images P3 and P4 and in which the captured images P3 and P4 are arranged side-by-side in the vertical direction. Subsequently, the picture synthesizing unit 1502 outputs the composite image to the output unit 1503. As a result, as illustrated in FIG. 21, the picture synthesizing unit 1502 displays the common image P1 and the captured images P3 and P4 on the display screen G in such a way that the display position of the common image P1 is on the right of the display positions of the captured images P3 and P4 when facing the display screen G as well as the display positions of the captured images P3 and P4 are arranged side-by-side in the vertical direction.

In the first modification example, the common image P1 and the captured images P3 and P4, which are captured at two centers, are displayed side-by-side in the left and right direction. However, the common image can be displayed side-by-side in the left and right direction along with captured images that are captured at more than two centers. Moreover, in the first embodiment, the captured images P3 and P4 that are captured at a plurality of centers are displayed at the same time. However, alternatively, the captured images P3 and P4 can be alternately displayed by switching between them at predetermined time intervals.

In this way, in the information processing device 1500 according to the first modification example, it becomes possible to achieve the same function effect to that achieved in the first embodiment and the second embodiment.

Third Embodiment

In a third embodiment, the explanation is given for an example in which image position information is received that indicates the display position of a captured image in the left and right direction with reference to the position of a common image when facing the display screen of the display device installed at another center; and, based on the image position information that is received, the common image and the captured image are displayed on the display device at the concerned center in such a way that the display position specified in the image position information is opposite to the display position of the common image in the left and right direction with reference to the display position of the captured image when facing the display screen of the display device installed at the concerned center. In the following explanation, the contents identical to the first embodiment are not explained again.

Figure 22A:
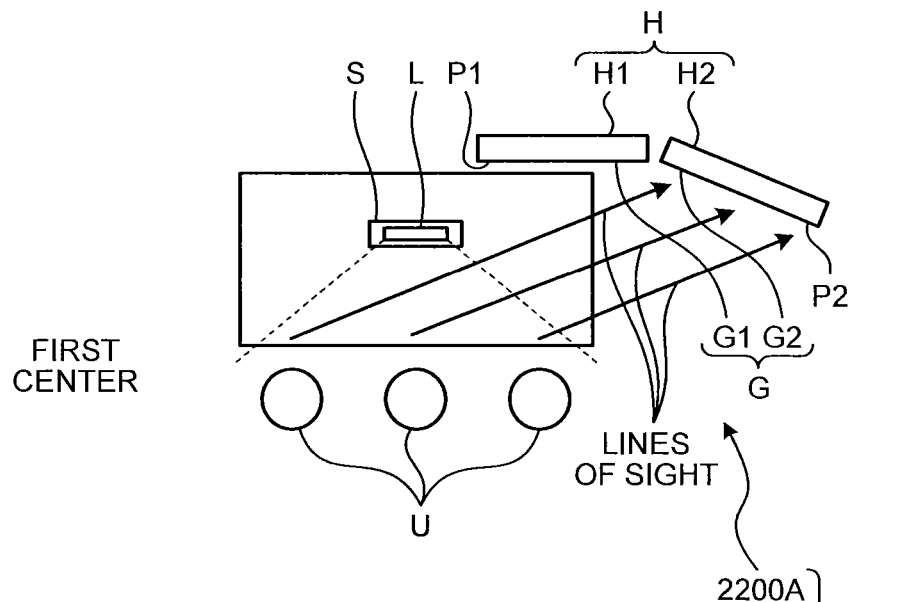
FIGS. 22A to 23B are diagrams for explaining the display positions of the common image and the captured image in information processing devices according to a third embodiment.
Figure 22B:
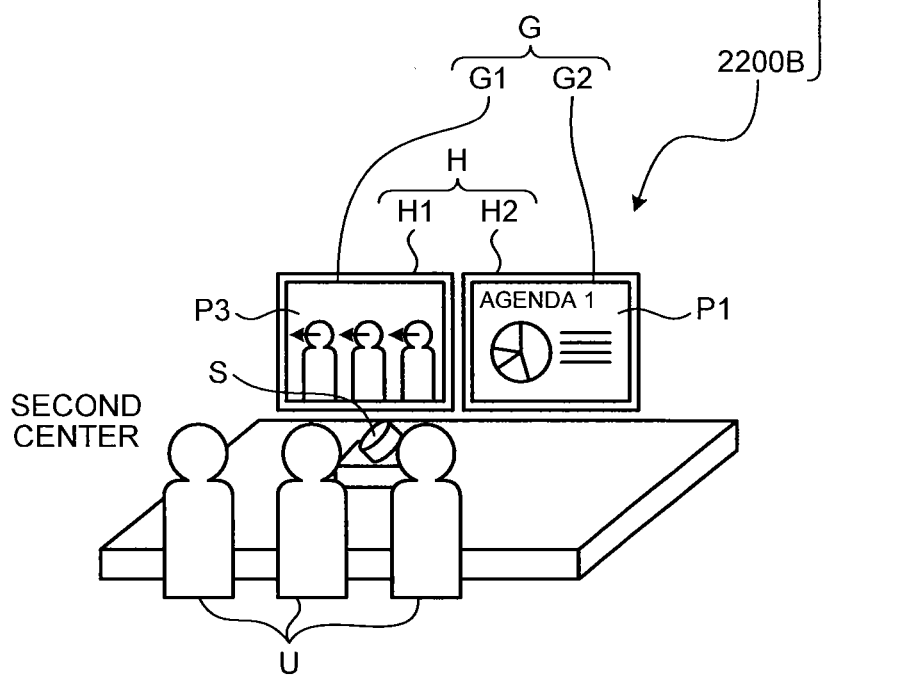
Figure 23A:
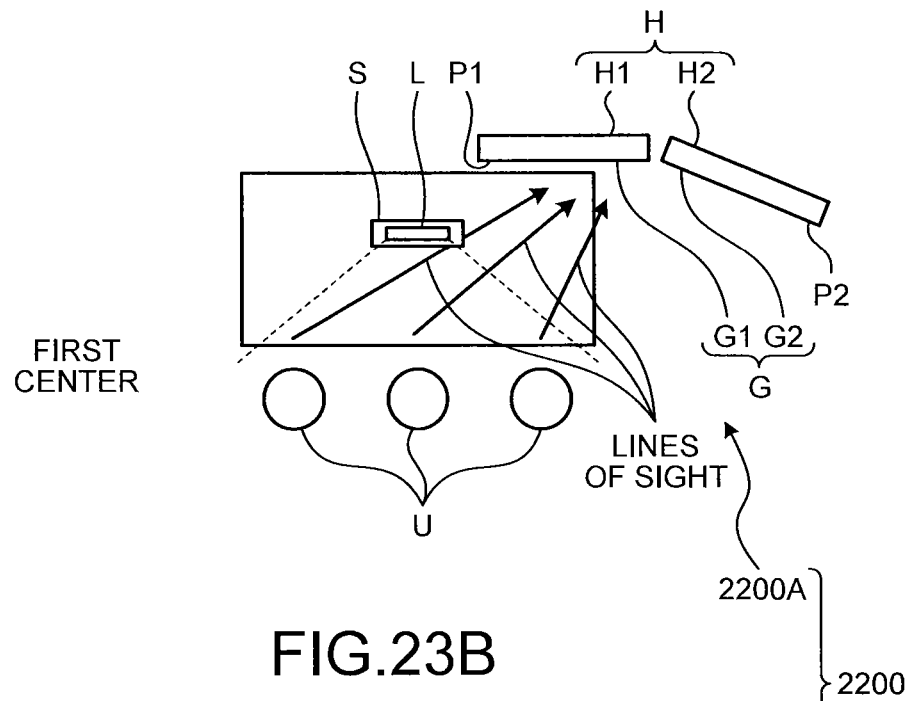
Figure 23B:
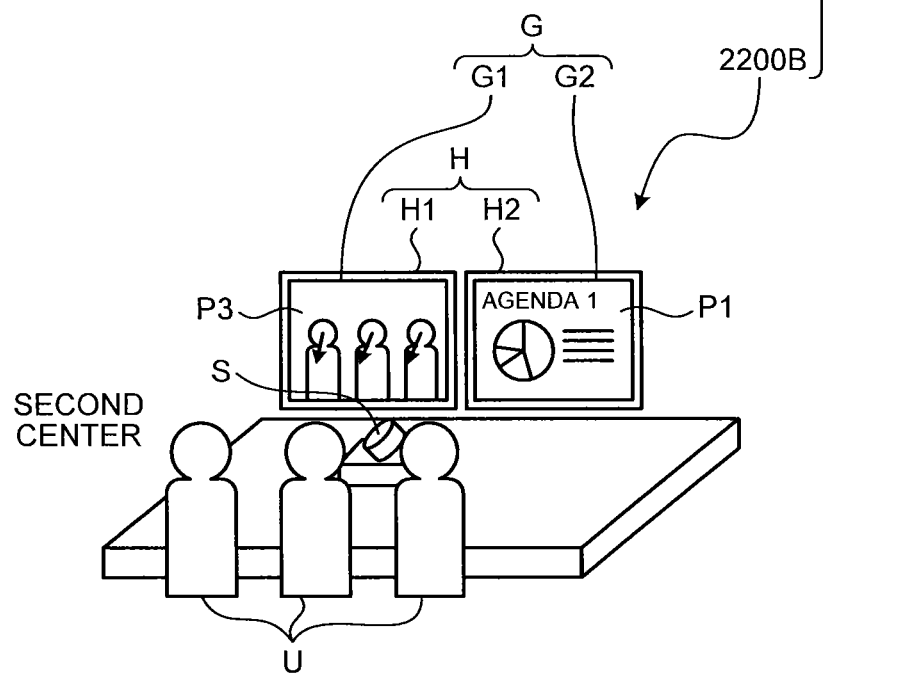

FIGS. 22A to 23B are diagrams for explaining the display positions of the common image and the captured image in an information processing device according to the third embodiment. FIGS. 22A and 23A are diagrams illustrating a view when an information processing device 2200A installed at the first center is seen from above. FIGS. 22B and 23B are diagrams for explaining the display positions of the common image P1 and the captured image P3 with respect to the primary display screen G1 of the primary display device H1 and the secondary display screen G2 of the secondary display device H2 installed at the second center.

In the third embodiment, to an information processing device 2200B that is installed at the second center, the information processing device 2200A installed at the first center sends image position information that is related to the display position of the captured image P2 with reference to the display position of the common image P1 when facing the display screens G of the display devices H installed at the first center. Moreover, from the information processing device 2200B that is installed at the second center, the information processing device 2200A installed at the first center receives image position information that is related to the display position of the captured image P3 with reference to the display position of the common image P1 when facing the display screens G of the display devices H installed at the second center.

Similarly, to the information processing device 2200A that is installed at the first center, the information processing device 2200B installed at the second center sends image position information that is related to the display position of the captured image P3 with reference to the display position of the common image P1 when facing the display screens G of the display devices H installed at the second center. Moreover, from the information processing device 2200A that is installed at the first center, the information processing device 2200B installed at the second center receives image position information that is related to the display position of the captured image P2 with reference to the display position of the common image P1 when facing the display screens G of the display devices H installed at the first center.

Herein, the explanation is given about the image position information that is sent and received between the information processing device 2200A installed at the first center and the information processing device 2200B installed at the second center. In the third embodiment, the image position information represents the information indicating the display position of the captured image P2 (or the captured image P3) with reference to the display position of the common image P1 when facing the display screens G of the display devices H. More particularly, the image position information represents the information indicating that the display position of the captured image P2 (or the captured image P3) is either "on left of common image", or "on right of common image", or "neither on left nor on right of common image" when facing the display screens G of the display devices H.

Herein, "on left of common image" indicates that, when facing the display screens G of the display devices H, the display position of the captured image P2 (or the captured image P3) is on the left of the display position of the common image P1. In contrast, "on right of common image" indicates that, when facing the display screens G of the display devices H, the display position of the captured image P2 (or the captured image P3) is on the right of the display position of the common image P1. Moreover, "neither on left nor on right of captured image" indicates a state in which it is not possible to identify the display position of the captured image P2 (or the captured image P3) with reference to the display position of the common image P1. For example, "neither on left nor on right of captured image" indicates a state in which nothing is being displayed on the display screens G of the display devices H or indicates a state in which the common image P1 and the captured image P2 (or the captured image P3) are displayed side-by-side in the vertical direction on the display screens G of the display devices H.

Based on the image position information received from the information processing device 2200B installed at the second center, the information processing device 2200A installed at the first center displays the common image P1 and the captured image P2 on the display devices H at the first center in such a way that the display position specified in the image position information is opposite to the display position of the common image P1 in the left and right direction with reference to the display position of the captured image P2 when facing the display screens G of the display devices H installed at the first center. Similarly, based on the image position information received from the information processing device 2200A installed at the first center, the information processing device 2200B installed at the second center displays the common image P1 and the captured image P3 on the display devices H at the second center in such a way that the display position specified in the image position information is opposite to the display position of the common image P1 in the left and right direction with reference to the display position of the captured image P3 when facing the display screens G of the display devices H installed at the second center.

Meanwhile, as illustrated in FIG. 22A, with reference to the position of the image capturing unit S when facing the display screens G of the display devices H installed at the first center, if the display positions of the common image P1 and the captured image P2 in the left and right direction are on the same side with respect to the position of the image capturing unit S; it is highly likely that the participants U captured in the captured image P3, which is obtained by the image capturing unit S installed at the first center, have their lines of sight in the leftward direction. In that case, the information processing device 2200A installed at the first center sends the image position information indicating "on right of captured image" to the information processing device 2200B installed at the second center. For that reason, based on the image position information indicating "on right of captured image", the information processing device 2200B installed at the second center displays the captured image P3 on the left of the display position of the common image P1 when facing the display screens G of the display devices H installed at the second center. However, as illustrated in FIG. 22B, the participants U captured in the captured image P3 have their lines of sight in the leftward direction and not in the direction of the display position of the common image P1. Hence, at the time of displaying the captured image P3 and the common image P1 side-by-side in the left and right direction, there is a possibility that the lines of sight of the participants U captured in the captured image P3 appear unnatural.

However, as illustrated in FIG. 23A, if the participants U participating at the first center have their lines of sight directed at the common image P1; then the participants U captured in the captured image P3, which is obtained by the image capturing unit S installed at the first center, come to have their lines of sight in the front direction. In this case too, based on the image position information indicating "on right of captured image", the information processing device 2200B installed at the second center displays the captured image P3 on the left of the display position of the common image P1 when facing the display screens G of the display devices H installed at the second center. As a result, as illustrated in FIG. 23B, although the participants U captured in the captured image P3 have their lines of sight in the leftward direction, those lines of sight are closer to the direction of the display position of the common image P1 as compared to the lines of sight of the participants U captured in the captured image P3 illustrated in FIG. 22B. For that reason, at the time of displaying the captured image P3 and the common image P1 side-by-side in the left and right direction, it becomes possible to prevent a situation in which the lines of sight of the participants U captured in the captured image P3 appear unnatural.

Figure 24:
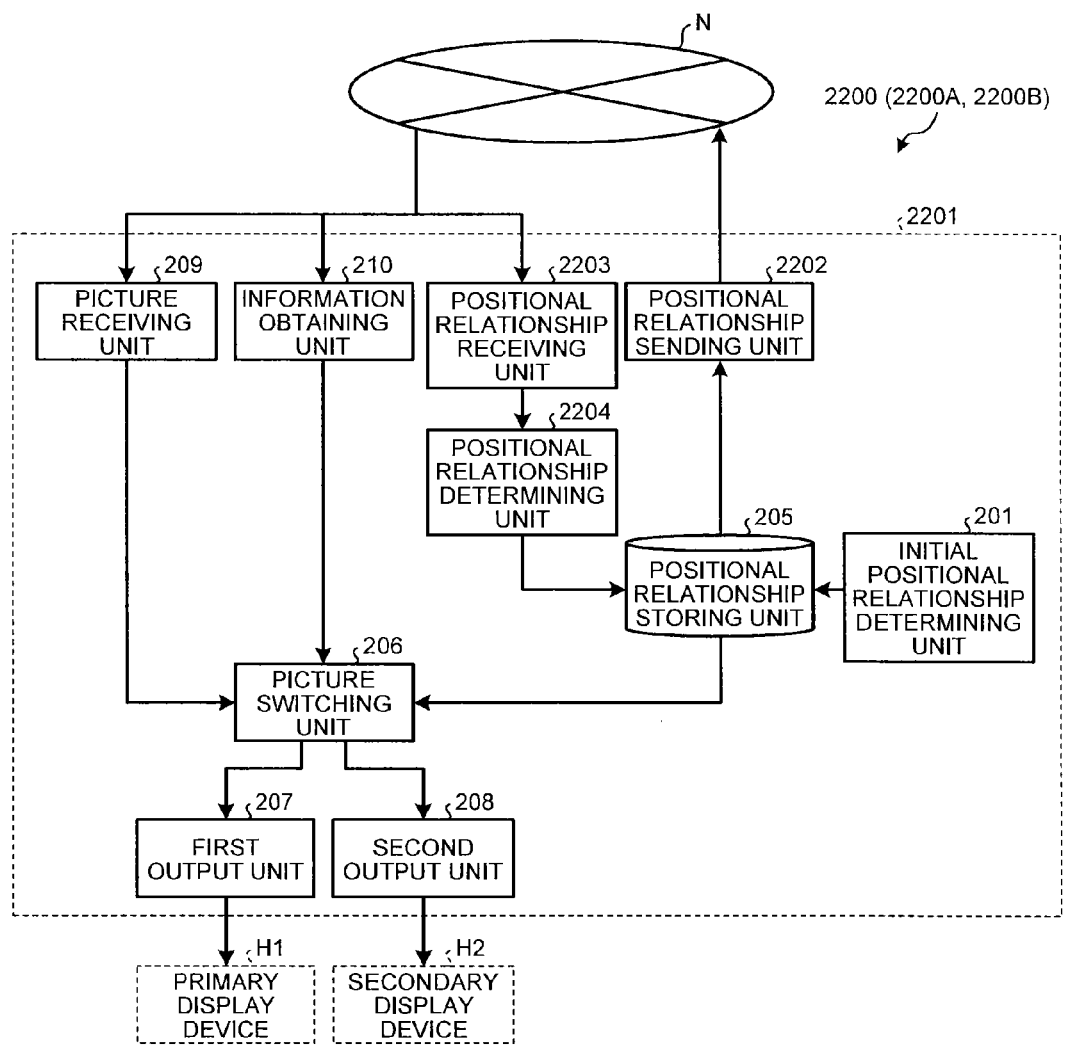
FIG. 24 is a block diagram illustrating a functional configuration of the information processing devices according to the third embodiment.

FIG. 24 is a block diagram illustrating a functional configuration of each information processing device according to the third embodiment. As illustrated in FIG. 24, a control unit 2201 of the information processing device 2200 functions as the initial positional relationship determining unit 201, a positional relationship sending unit 2202, a positional relationship receiving unit 2203, a positional relationship determining unit 2204, the positional relationship storing unit 205, the picture switching unit 206, the first output unit 207, the second output unit 208, the picture receiving unit 209, and the information obtaining unit 210. Herein, the following explanation is given about the functional configuration of the information processing device 2200B installed at the second center. However, the information processing device 2200A installed at the first center also has a similar functional configuration.

When the information processing device 2200A installed at the first center issues a connection request to the information processing device 2200B installed at the second center; the positional relationship sending unit 2202 installed at the second center receives that connection request. Then, once communication is established with the information processing device 2200A installed at the first center, the positional relationship sending unit 2202 sends the position information, which is stored in the positional relationship storing unit 205, to the information processing device 2200 that had issued the request. In the third embodiment, it is assumed that the initial positional relationship determining unit 201 obtains the image position information based on the initial position that has been set, and stores the image position information in the positional relationship storing unit 205. For example, if the initial position is set to be "on left of captured image", the initial positional relationship determining unit 201 obtains "on right of common image" as the image position information. In contrast, if the initial position is set to be "on right of captured image", the initial positional relationship determining unit 201 obtains "on left of common image" as the image position information.

At the time of issuing a connection request from the information processing device 2200B installed at the second center to the information processing device 2200A installed at the first center, the positional relationship receiving unit 2203 issues the connection request to the information processing device 2200A installed at the first center. Then, once communication is established with the information processing device 2200A installed at the first center, the positional relationship receiving unit 2203 receives the image position information that is stored in the positional relationship storing unit 205 of the information processing device 2200A installed at the first center.

Based on the image position information received by the positional relationship receiving unit 2203, the positional relationship determining unit 2204 sets the common image position that represents the display position of the common image P1 in the left and right direction with reference to the display position of the captured image P3 when facing the display screens G of the display devices H installed at the second center; and updates the initial position with the common image position.

Figure 25:
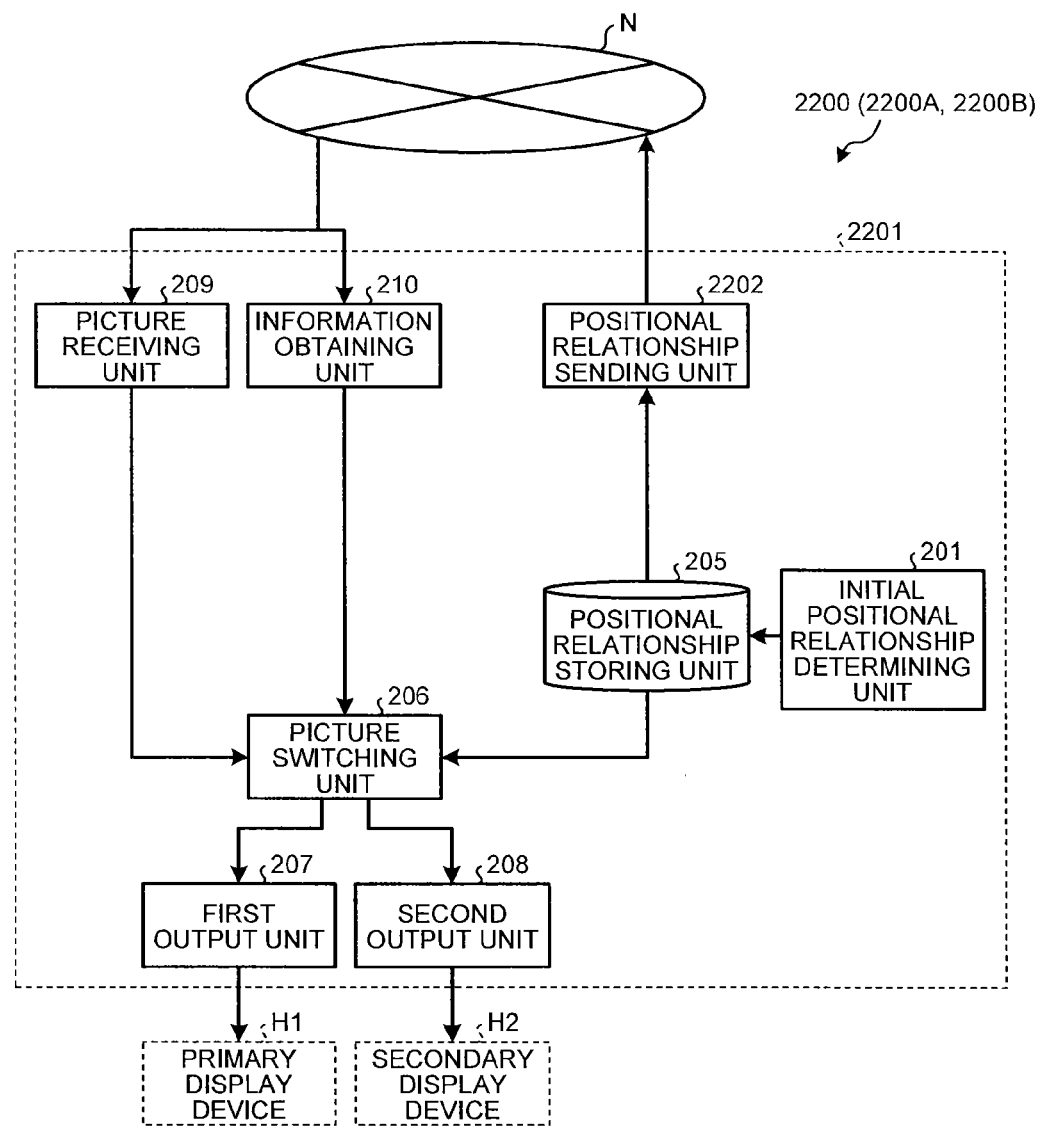
FIG. 25 is a block diagram illustrating a functional configuration of an information processing device that functions as a receiver of connection requests.
Figure 26:
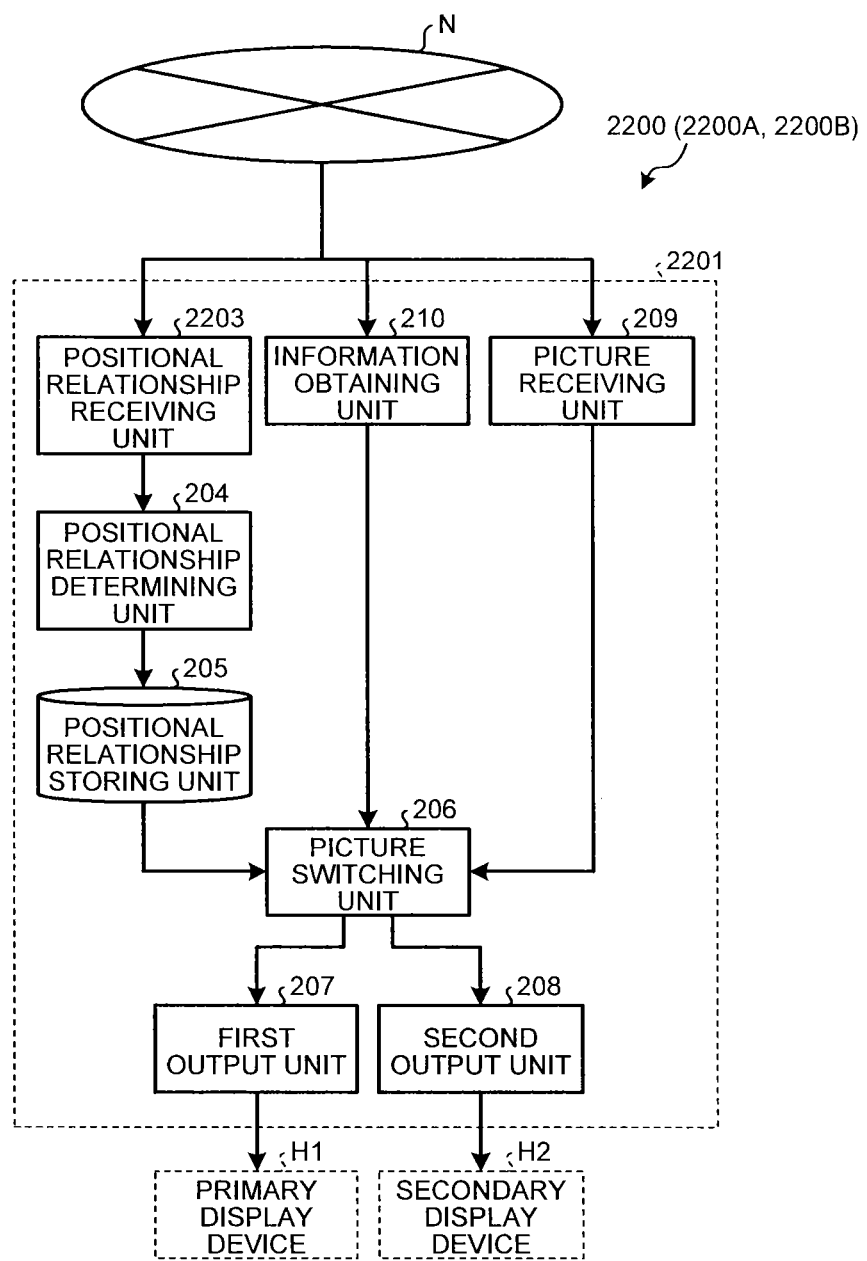
FIG. 26 is a block diagram illustrating a functional configuration of an information processing device that functions as a sender of connection requests.

In the third embodiment, the information processing device 2200A installed at the first center and the information processing device 2200B installed at the second center have a similar functional configuration so as to ensure that each of them functions as a receiver of connection requests as well as a sender of connection requests. However, it is not limited thereto. FIG. 25 is a block diagram illustrating a functional configuration of an information processing device that functions as a receiver of connection requests. FIG. 26 is a block diagram illustrating a functional configuration of an information processing device that functions as a sender of connection requests. For example, as illustrated in FIG. 25, as long as the information processing device 2200 functioning as a receiver of connection requests includes at least the initial positional relationship determining unit 201, the positional relationship sending unit 2202, the positional relationship storing unit 205, the picture switching unit 206, the first output unit 207, the second output unit 208, the picture receiving unit 209, and the information obtaining unit 210; it serves the purpose. On the other hand, as illustrated in FIG. 26, as long as the information processing device 2200 functioning as a sender of connection requests includes at least the positional relationship receiving unit 2203, the positional relationship determining unit 2204, the positional relationship storing unit 205, the picture switching unit 206, the first output unit 207, the second output unit 208, the picture receiving unit 209, and the information obtaining unit 210; it serves the purpose.

Figure 27:
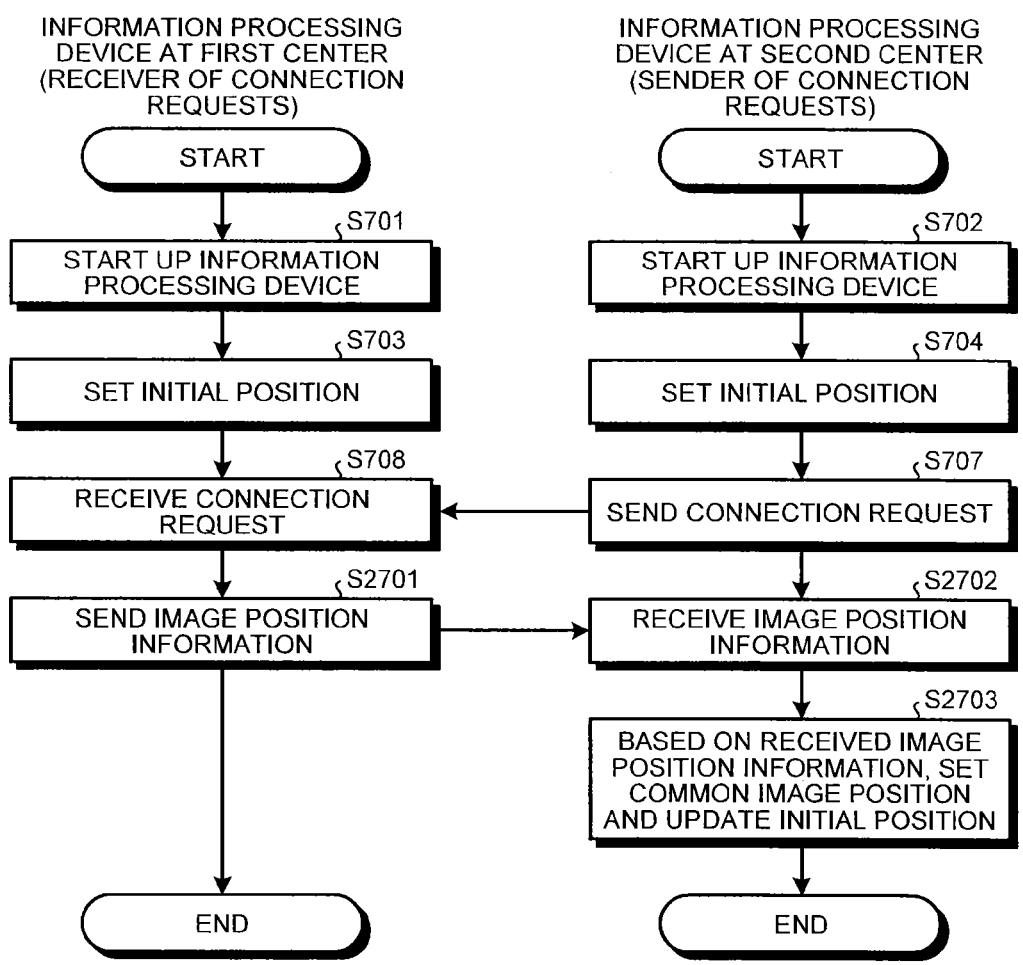
FIG. 27 is a flowchart for explaining a sequence of operations during an image display operation performed in the information processing devices according to the third embodiment.

Explained below with reference to FIG. 27 is an image display operation performed in the information processing devices 2200 according to the third embodiment. FIG. 27 is a flowchart for explaining a sequence of operations during the image display operation performed in the information processing devices according to the third embodiment. The following explanation is given for a case in which the image display operation is performed when the information processing device 2200B installed at the second center issues a connection request to the information processing device 2200A installed at the first center. However, also in the case when the information processing device 2200A installed at the first center issues a connection request to the information processing device 2200B installed at the second center, the image display operation is performed in a similar manner.

When the information processing device 2200A installed at the first center receives the connection request (Step S708), the positional relationship sending unit 2202 installed at the first center sends the image position information, which is stored in the corresponding positional relationship storing unit 205, to the information processing device 2200B installed at the second center (Step S2701).

Then, the positional relationship receiving unit 203 of the information processing device 2200B installed at the second center receives the image position information sent by the information processing device 2200A installed at the first center (Step S2702). Subsequently, based on the received image position information, the positional relationship determining unit 2204 installed at the second center sets the common image position that represents the display position of the common image P1 in the left and right direction with reference to the display position of the captured image P3 when facing the display screens G of the display devices H installed at the second center; and updates the initial position with the common image position (Step S2703).

Figure 28:
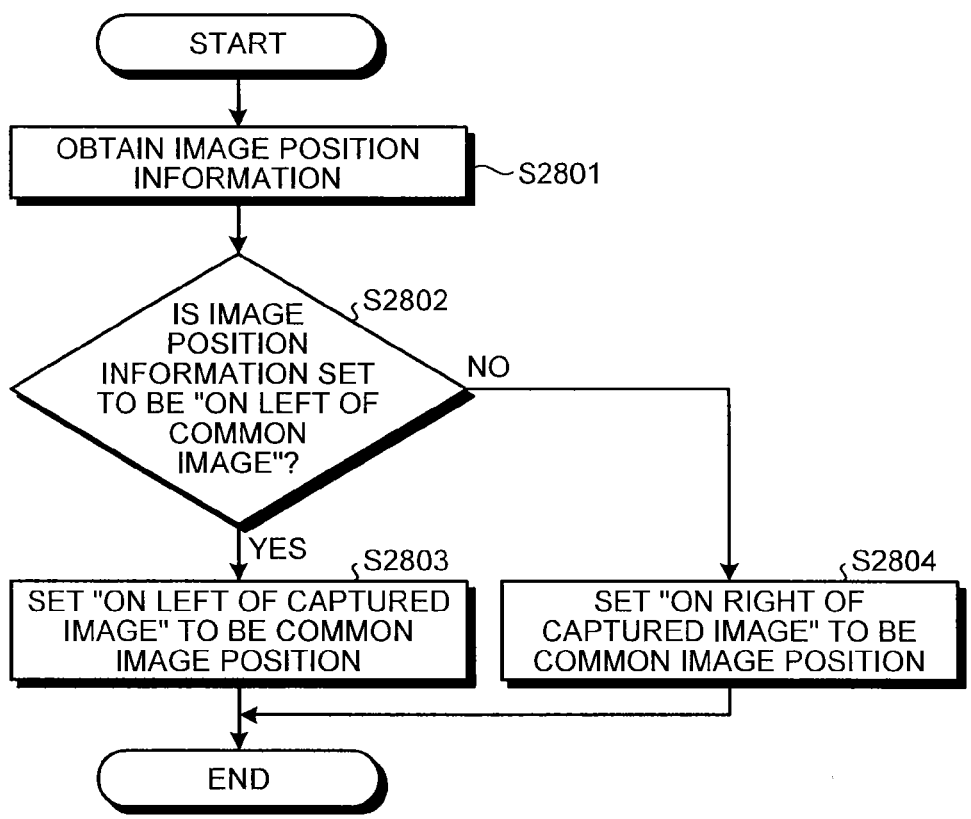
FIG. 28 is a flowchart for explaining a sequence of operations during an operation by which a positional relationship determining unit of the information processing device according to the third embodiment sets the common image position.

Explained below with reference to FIG. 28 are the details of the operation by which the positional relationship determining unit 2204 sets the common image position. FIG. 28 is a flowchart for explaining a sequence of operations during the operation by which the positional relationship determining unit of the information processing device according to the third embodiment sets the common image position. The following explanation is given about the operation by which the positional relationship determining unit 2204 of the information processing device 2200B installed at the second center sets the common image position. However, the positional relationship determining unit 2204 of the information processing device 2200A installed at the first center also sets the common image position by performing a similar operation.

The positional relationship determining unit 2204 of the information processing device 2200B installed at the second center obtains the image position information received by the positional relationship receiving unit 203 (Step S2801). Then, the positional relationship determining unit 2204 determines whether or not the obtained image position information is set to be "on left of common image" (i.e., whether or not the position of the captured image P2 in the left and right direction with reference to the display position of the common image P1 when facing the display screens G of the display devices H installed at the first center is on the left of the display position of the common image P1) (Step S2802).

If the obtained image position information is set to be "on left of common image" (Yes at Step S2802), then the positional relationship determining unit 2204 sets "on left of captured image" to be the common image position (Step S2803). More particularly, if the obtained image position information is set to be "on left of common image", then the display position of the common image P1 at the first center is on the right of the display position of the captured image P2 when facing the primary display screen G1 and the secondary display screen G2 as illustrated in FIG. 11. Then, the participants U participating at the first center have their lines of sight directed toward the right of the display position of the captured image P2 when facing the primary display screen G1 and the secondary display screen G2. For that reason, the captured image P3, which is obtained by the image capturing unit S installed at the first center, includes the participants U looking left as illustrated in FIG. 11.

In this case, the positional relationship determining unit 2204 installed at the second center sets "on left of captured image" to be the display position of the common image P1 (i.e., to be the common image position) with reference to the display position of the captured image P3 when facing the primary display screen G1 and the secondary display screen G2. As a result, as illustrated in FIG. 11, the picture switching unit 206 installed at the second center outputs the common image P1 to the first output unit 207 for displaying it on the primary display screen G1 and outputs the captured image P3 to the second output unit 208 for displaying it on the secondary display screen G2.

Thus, the positional relationship determining unit 2204 and the picture switching unit 206 installed at the second center display the common image P1 and the captured image P3 on the display devices H at the second center in such a way that, as illustrated in FIG. 11, the display position of the common image P1 in the left and right direction with reference to the display position of the captured image P3 when facing the display devices H (the primary display device H1 and the secondary display device H2) installed at the second center is on the opposite side of the display position of the common image P1 in the left and right direction with reference to the position of the captured image P2 when facing the display screens G (the primary display screen G1 and the secondary display screen G2) of the display devices H (the primary display device H1 and the secondary display device H2) installed at the first center.

As a result, the common image P1, which is displayed on the primary display screen G1 of the primary display device H1 installed at the second center, is present in the direction (the leftward direction) of the lines of sight of the participants U captured in the captured image P3, which is displayed on the secondary display screen G2 of the secondary display device H2 installed at the second center. For that reason, at the time of displaying the common image P1 and the captured image P3 on the display screens G (the primary display screen G1 and the secondary display screen G2), it becomes possible to prevent a situation in which the lines of sight of the persons captured in the captured image P3 appear unnatural.

Meanwhile, if the obtained image position information is set to be "on right of common image" (No at Step S2802), then the positional relationship determining unit 2204 sets "on right of captured image" to be the common image position (Step S2804). More particularly, if the obtained image position information is set to "on right of common image", then the display position of the common image P1 is on the left of the display position of the captured image P2 when facing the primary display screen G1 and the secondary display screen G2 as illustrated in FIG. 13. Then, the participants U participating at the first center have their lines of sight directed on the left of the display position of captured image P2 when facing the primary display screen G1 and the secondary display screen G2. For that reason, the captured image P3 that is obtained by the image capturing units S installed at the first center includes the participants U looking right direction as illustrated in FIG. 13.

In this case, the positional relationship determining unit 2204 installed at the second center sets "on right of captured image" to be the display position of the common image P1 (i.e., to be the common image position) with reference to the display position of the captured image P3 when facing the primary display screen G1 and the second display screen G2 installed at the second center. As a result, as illustrated in FIG. 13, the picture switching unit 206 installed at the second center outputs the common image P1 to the second output unit 208 for displaying it on the secondary display screen G2 and outputs the captured image P3 to the first output unit 207 for displaying it on the primary display screen G1.

Thus, the positional relationship determining unit 2204 and the picture switching unit 206 installed at the second center display the common image P1 and the captured image P3 on the display devices H at the second center in such a way that, as illustrated in FIG. 13, the display position of the common image P1 in the left and right direction with reference to the display position of the captured image P3 when facing the display devices H (the primary display device H1 and the secondary display device H2) installed at the second center is on the opposite side of the display position of the common image P1 in the left and right direction with reference to the display position of the captured image P2 when facing the display screens G (the primary display screen G1 and the secondary display screen G2) of the display devices H (the primary display device H1 and the secondary display device H2) installed at the first center.

As a result, the common image P1, which is displayed on the secondary display screen G2 of the secondary display device H2 installed at the second center, is present in the direction (the rightward direction) of the lines of sight of the participants U captured in the captured image P3, which is displayed on the primary display screen G1 of the primary display device H1 installed at the second center. For that reason, at the time of displaying the common image P1 and the captured image P3 on the display screens G (the primary display screen G1 and the secondary display screen G2), it becomes possible to prevent a situation in which the lines of sight of the persons captured in the captured image P3 appear unnatural.

In this way, in the information processing device 2200 according to the third embodiment, the image position information is received that indicates the display position of the captured image P2 in the left and right direction with reference to the display position of the common image P1 when facing the display screens G of the display devices H installed at the first center. Then, based on the image position information that is received, the common image P1 and the captured image P3 are displayed on the display devices H at the second center in such a way that the display position specified in the image position information is opposite to the display position of the common image P1 in the left and right direction with reference to the display position of the captured image P3 when facing the display screens G of the display devices H installed at the second center. As a result, it becomes possible to achieve the same function effect to that achieved in the first embodiment.

Fourth Embodiment

In a fourth embodiment, the explanation is given for an example in which a person position is detected that represents the position in the left and right direction of a person who is present within a predetermined range from display devices with reference to the position of the display devices when facing them; and the display position of a common image in the left and right direction, with reference to the display position of a captured image when facing the display devices, is set to be on the same side as the detected person position. In the following explanation, the contents identical to the first embodiment are not explained again.

Figure 29:
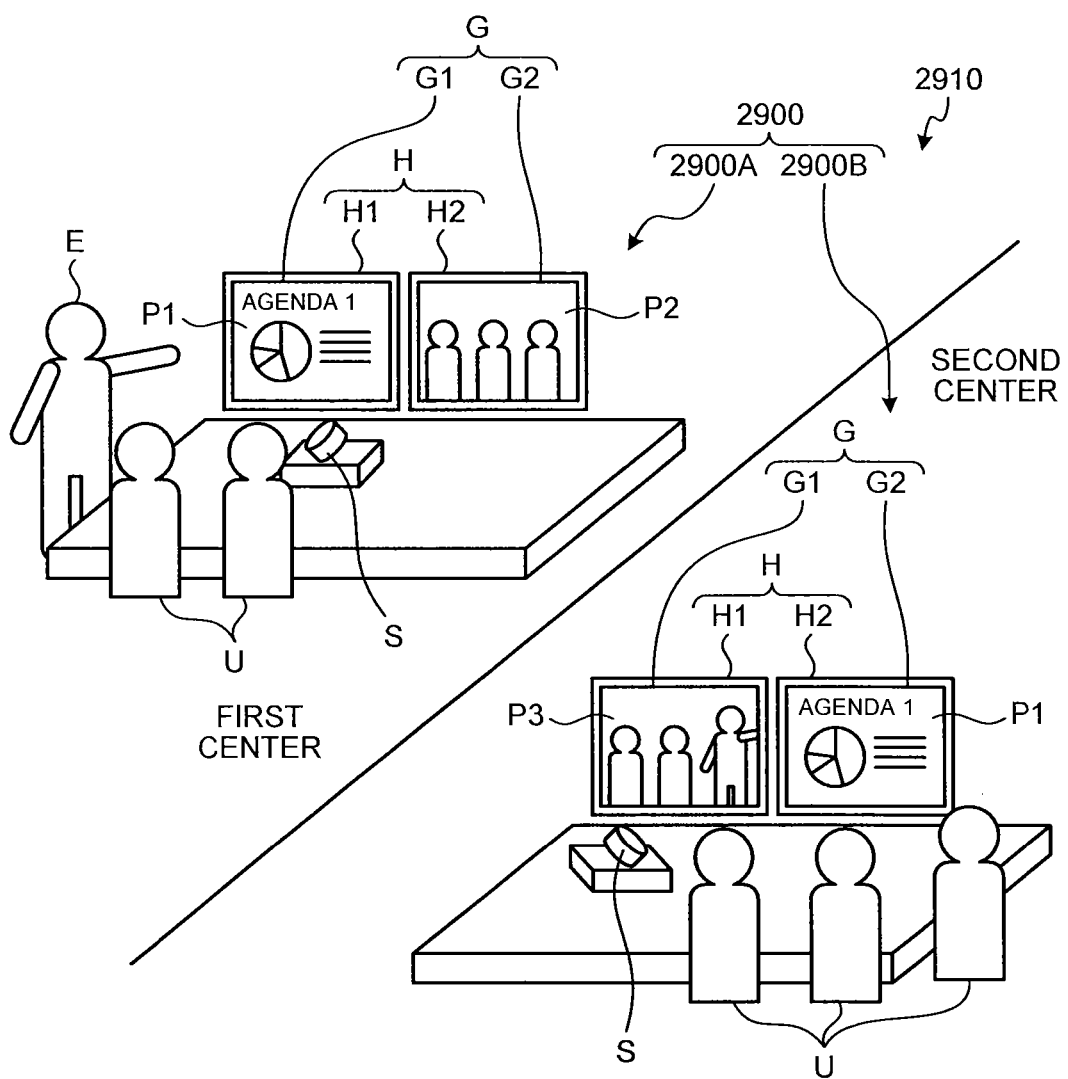
FIGS. 29 and 30 are diagrams illustrating a configuration of a display control system according to a fourth embodiment.
Figure 30:
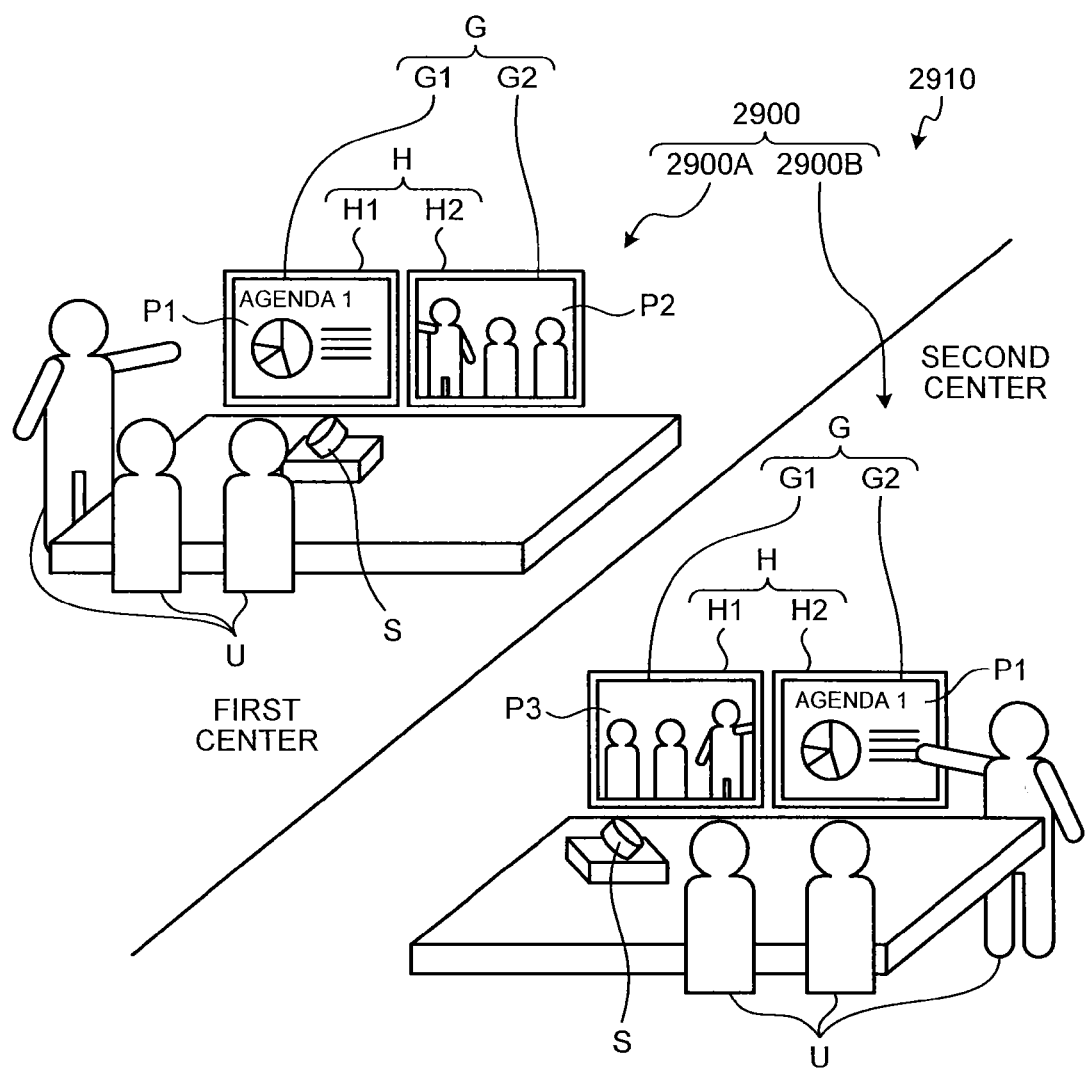

FIGS. 29 and 30 are diagrams illustrating a configuration of a display control system according to the fourth embodiment. As illustrated in FIG. 29, in a display control system 2910 according to the fourth embodiment, at the first center, when the position of an explainer E who is present within a predetermined range from the display devices H is on the left of the display devices H when facing them, an information processing device 2900A installed at the first center sets the display position of the common image P1 with reference to the display position of the captured image P2 when facing the display devices H to be on the same side as the position of the explainer E (that is, on the left of the captured image P2 when facing the display screens G).

On the other hand, as illustrated in FIG. 29, at the second center, since the explainer E is not present in the predetermined range from the display devices H, an information processing device 2900B installed at the second center displays the captured image P3 and the common image P1 on the display devices H based on position information (such as "on left of image capturing unit"), which is received from the information processing device 2900A, and in such a way that the display position specified in the position information is opposite to the display position of the common image P1 in the left and right direction with reference to the display position of the captured image P3 when facing the display devices H (for example, in such a way that the common image P1 is displayed on the right of the captured image P3 when facing the display device H).

As a result, at the first center, even in the case when the explainer E does not have the understanding about the position of the common image P1 on the display screens G of the display devices H in the left and right direction and does not move around accordingly, the common image P1 is displayed in the direction in which the explainer E moves, along the left and right direction of the display screens G. Hence, the explainer E can give an explanation about the common image P1 at an easily-reachable position. Meanwhile, at the second center, at the time of displaying the captured image P3 and the common image P1 side-by-side in the left and right direction, the participants U and the explainer E captured in the captured image P3 have their lines of sight directed in the direction of the common image P1. As a result, it becomes possible to prevent a situation in which the lines of sight of the participants U and the explainer E captured in the captured image P3 appear unnatural. Moreover, at the second center, the common image P1 is displayed in the vicinity of the explainer E who is captured in the captured P3. Hence, the explainer E captured in the captured P3 and the common image P1 can be viewed at the same time without having to move the line of sight.

Meanwhile, in the case when a participant U participating at the second center moves in the vicinity of the common image P1 from the state illustrated in FIG. 29 and gives an explanation about the common image P1 (see FIG. 30); it is possible to think that the participant U moves to the right of the display devices H. In that case, at the second center too, the common image P1 is displayed in the vicinity of the participant U who has moved (i.e., in the vicinity of the explainer E). That enables the other participants U to view the common image P1 and the explainer E at the same time without having to move their lines of sight.

Moreover, in the fourth embodiment, if the position of the explainer E at the first center is on the same side as the position of the explainer E at the second center, then the display position of the captured image P2 (or the captured image P3) and the display position of the common image P1 have the same positional relationship at both centers. As a result, there is a possibility that the participants U captured in the captured image P2 (or the captured image P3) at both centers cannot have their lines of sight in the direction of the captured image P1, thereby making the lines of sight appear unnatural. However, in the fourth embodiment, priority is given to achieving the effect that the explainer E can explain the display contents of the common image P1 in the vicinity of the common image P1 without having to bother about the display position of the common image P1. Hence, the display position of the common image P1 in the left and right direction with reference to the display of the captured image P2 (or the captured image P3) when facing the display screens G of the display images H is set to be on the same side as the position of the explainer E.

Figure 31:
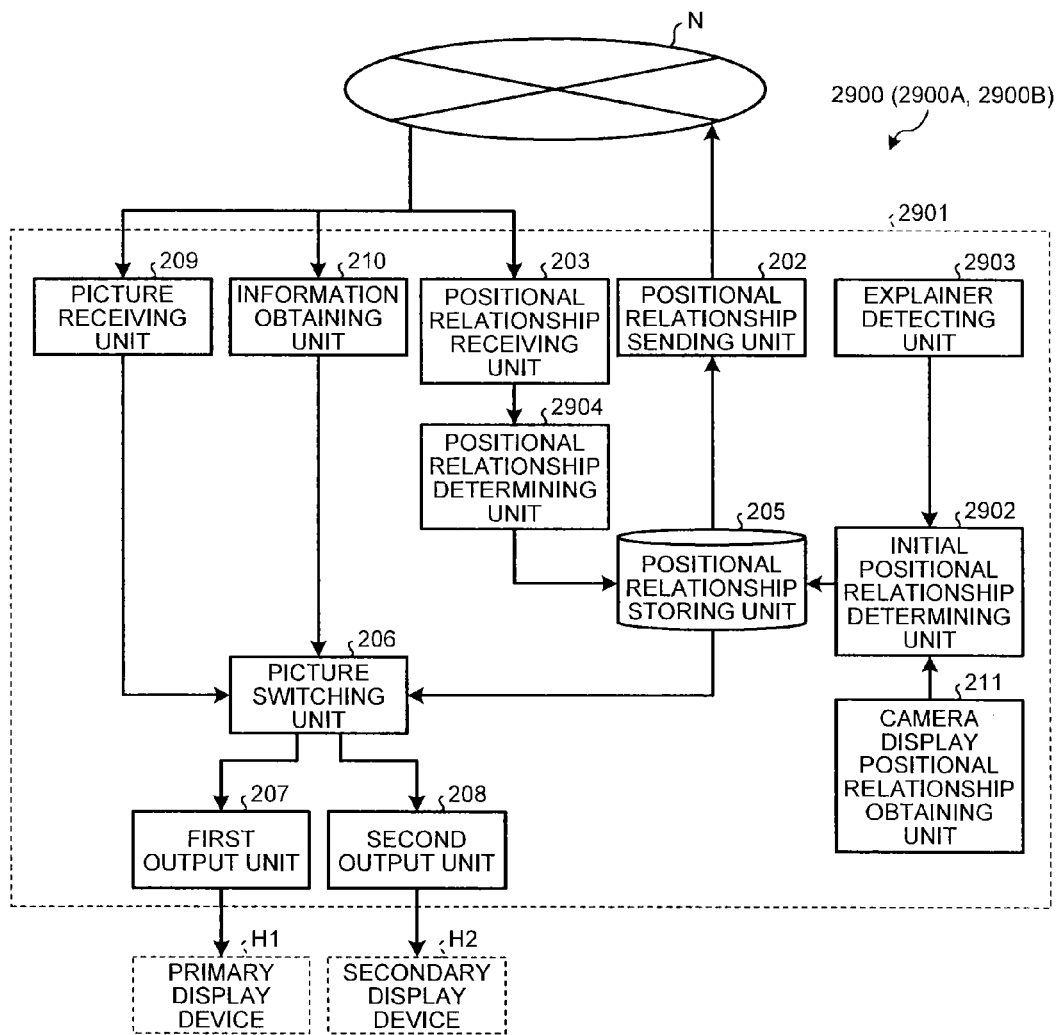
FIG. 31 is a block diagram illustrating a functional configuration of information processing devices according to the fourth embodiment.

FIG. 31 is a block diagram illustrating a functional configuration of each information processing device according to the fourth embodiment. As illustrated in FIG. 31, a control unit 2901 of the information processing device 2900 functions as the positional relationship sending unit 202, the positional relationship receiving unit 203, the positional relationship storing unit 205, the picture switching unit 206, the first output unit 207, the second output unit 208, the picture receiving unit 209, the information obtaining unit 210, the camera display positional relationship obtaining unit 211, an initial positional relationship determining unit 2902, an explainer detecting unit 2903, and a positional relationship determining unit 2904. Herein, the following explanation is given about the functional configuration of the information processing device 2900B installed at the second center. However, the information processing device 2900A installed at the first center also has a similar functional configuration.

The explainer detecting unit 2903 detects an explainer position (a person position) that represents the position in the left and right direction of the explainer E (a person) who is present within a predetermined range from the display devices H. In the fourth embodiment, based on at least either the captured image P2, which is obtained by the image capturing unit S of the information processing device 2900B installed at the second center, or the sounds input from the microphone unit 28; the explainer detecting unit 2903 detects whether or not the explainer E (a person) is present within a predetermined range from the display devices H (for example, within 30 cm from the display devices H) installed at the second center. Moreover, when the explainer E is present within a predetermined range from the display devices H installed at the second center, the explainer detecting unit 2903 detects the explainer position. Herein, the explainer E points to a participant U present within a predetermined range from the display devices H, or a participant U who is pointing a finger toward the common image P1, or a participant U who is saying something related to the common image P1. Meanwhile, the predetermined range can be set in an arbitrary manner by the user of the information processing device 2900.

Figure 32:
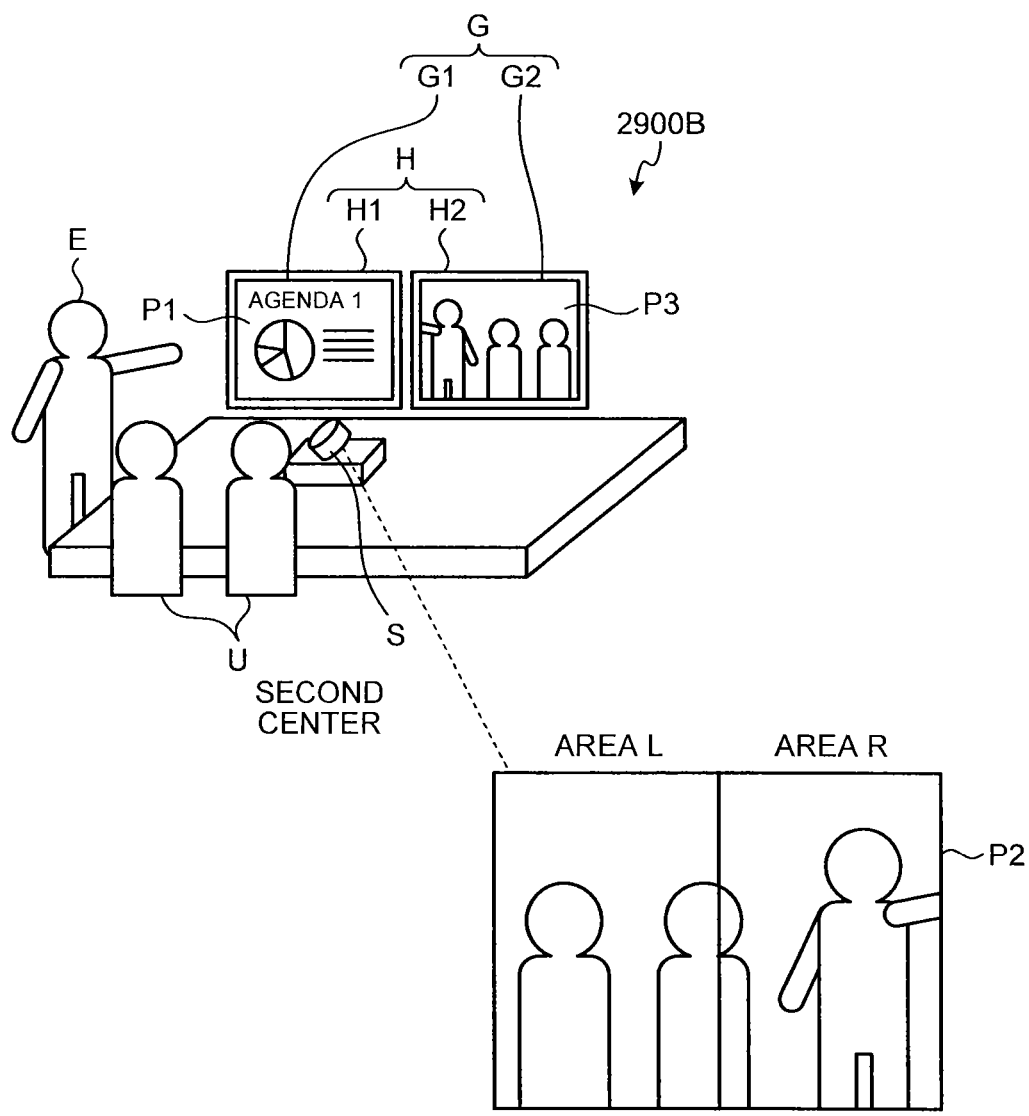
FIG. 32 is a diagram for explaining a detection operation performed by an explainer detecting unit of the information processing device according to the fourth embodiment for the purpose of detecting an explainer position.

FIG. 32 is a diagram for explaining a detection operation performed by the explainer detecting unit of the information processing device according to the fourth embodiment for the purpose of detecting the explainer position. As illustrated in FIG. 32, the explainer detecting unit 2903 determines whether the explainer E is present in an area R representing the right half or in an area L representing the left half of the captured image P2 obtained by the image capturing unit S. When the captured image P2 as illustrated in FIG. 32 is obtained, the explainer detecting unit 2903 determines that the explainer E is present in the area R. For example, the explainer detecting unit 2903 implements the technology disclosed in Japanese Patent No. 4389956, and detects the presence of the explainer E and detects the explainer position.

More particularly, the explainer detecting unit 2903 performs a face recognition operation in the captured image P2 obtained by the image capturing unit S. Then, if an explainer E having the face higher by 20 cm or more than the other faces is captured in the captured image P2, the explainer detecting unit 2903 determines whether or not the explainer E is present within a predetermined range from the display devices H as well as determines whether or not the explainer E is present in the right-hand area (the area R) or in the left-hand area (the area L).

Alternatively, the explainer detecting unit 2903 performs a face recognition operation in the captured image P2 obtained by the image capturing unit S. Then, depending on whether or not the faces of explainers E are present in the captured image P2 within a predetermined range from the display devices H, the explainer detecting unit 2903 detects whether explainers E are present within the predetermined range from the display devices H. If the explainers E are detected within the predetermined range from the display devices H, then the explainer detecting unit 2903 determines whether or not, from among the faces of the explainers E captured in the captured image P2 within a predetermined range from the display devices H, the explainer E having the face closest to the display position is present in the right-hand area (the area R) or the left-hand area (the area L) of the captured image P2.

In the fourth embodiment, it is assumed that the explainer detecting unit 2903 detects the explainer position during the startup of the information processing device 2900. However, it is not limited thereto. Alternatively, for example, the explainer position can be detected while a variety of information (such as the captured images P2 and P3 and the sounds) is being sent and received among the information processing devices 2900 installed at different centers (i.e., the explainer position can be detected during a conference), or the explainer position can be detected at regular time intervals. Thus, during a conference, if an explainer E leaves the conference or if a new explainer E participates in the conference, the explainer position is newly detected and the display position of the common image P1 is changed according to the newly-detected explainer position. Hence, at all times, the common image P1 and the explainer E can be viewed at the same time.

The initial positional relationship determining unit 2902 starts the operations when the information processing device 2900 is started up and firstly instructs the explainer detecting unit 2903 to detect the explainer position of the explainer E. Once the explainer detecting unit 2903 detects the explainer position; if it is determined that the detected explainer position is present in the area R of the captured image P2, then the initial positional relationship determining unit 2902 sets "on right of captured image" to be the common image position. On the other hand, if it is determined that the detected explainer position is present in the area L of the captured image P2, then the initial positional relationship determining unit 2902 sets "on left of captured image" to be the common image position.

Meanwhile, if the explainer detecting unit 2903 does not detect the explainer position, then the initial positional relationship determining unit 2902 sets information (such as "on left of captured image" or "on right of captured image"), which is set in advance, to be the initial position.

In the fourth embodiment, the positional relationship determining unit 2904 sets the common image position based on the position information received by the positional relationship receiving unit 203 and based on the explainer position detected by the explainer detecting unit 2903; and stores the common image position in the positional relationship storing unit 205.

Figure 33:
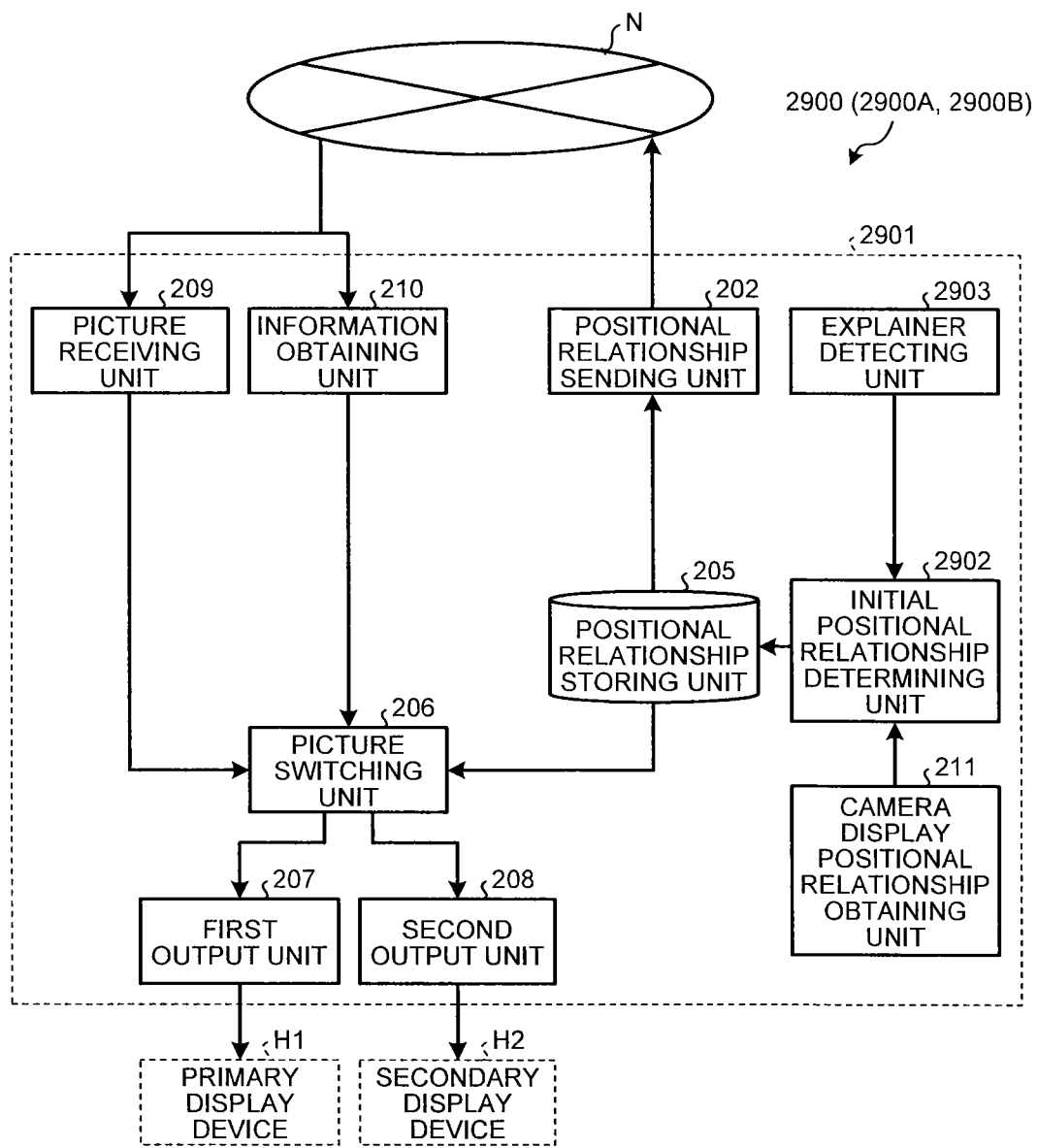
FIG. 33 is a block diagram illustrating another functional configuration of the information processing devices according to the fourth embodiment.

Meanwhile, regarding the functional configuration of the information processing device 2900 illustrated in FIG. 31, the explanation is given for a functional configuration that enables sending and receiving the position information. However, it is not limited thereto. Alternatively, as illustrated in FIG. 33, it is also possible to have a functional configuration that enables only sending the position information. As illustrated in FIG. 33, the functional configuration that enables only sending the position information does not include the positional relationship receiving unit 203 and the positional relationship determining unit 2904 illustrated in FIG. 31.

Figure 34:
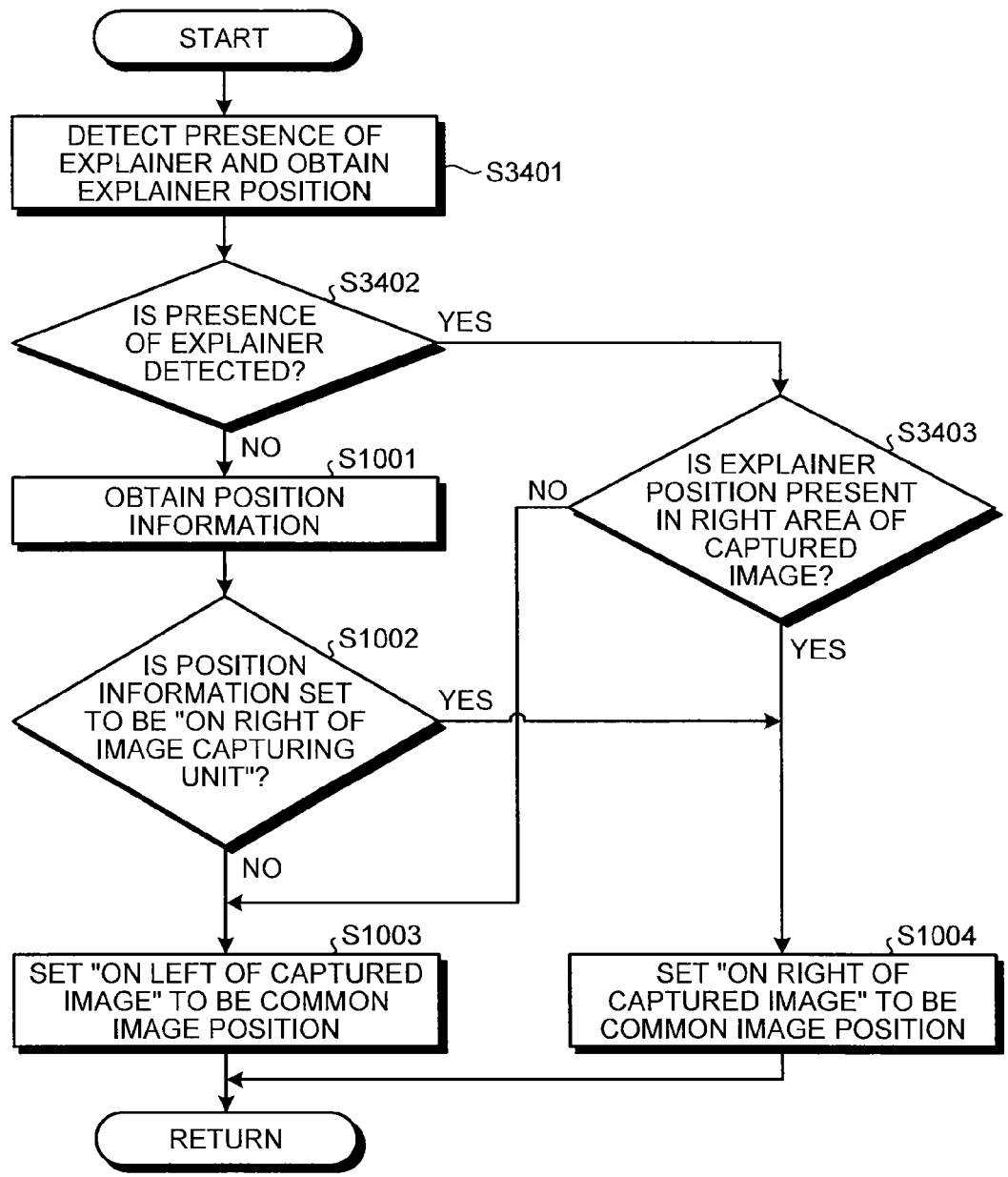
FIG. 34 is a flowchart for explaining a sequence of operations during an operation by which a positional relationship determining unit of the information processing device according to the fourth embodiment sets the common image position.

Explained below with reference to FIG. 34 are the details of the operation by which the positional relationship determining unit 2904 sets the common image position. FIG. 34 is a flowchart for explaining a sequence of operations during the operation by which the positional relationship determining unit of the information processing device according to the fourth embodiment sets the common image position. The following explanation is given about the operation by which the positional relationship determining unit 2904 of the information processing device 2900B installed at the second center sets the common image position. However, the positional relationship determining unit 2904 of the information processing device 2900A installed at the first center also sets the common image position by performing a similar operation.

The positional relationship determining unit 2904 obtains, from the explainer detecting unit 2903, the detection result of detecting the presence of the explainer E and detecting the explainer position (Step S3401). If the explainer detecting unit 2903 has not detected the presence of the explainer E (No at Step S3402), then the system control proceeds to Step S1001.

However, when the presence of the explainer E is detected (Yes at Step S3402), then the positional relationship determining unit 2904 determines whether or not the detected explainer position is present in the area R (the right-hand area) of the captured image P2 (Step S3403). If it is determined that the explainer position is present in the area R (Yes at Step S3403), then the positional relationship determining unit 2904 sets "on right of captured image" to be the common image position, that is, performs setting to display the captured image P3 on the right of the common image P1 (Step S1004). On the other hand, if it is determined that the explainer position is not present in the area R, that is, if it is determined that the explainer position is present in the area L (the left-hand area) (No at Step S3403); then the positional relationship determining unit 2904 sets "on left of captured image" to be the common image position, that is, performs setting to display the captured image P3 on the left of the common image P1 (Step S1003).

In this way, according to the fourth embodiment, an explainer position is detected that represents the position in the left and right direction of an explainer E who is present within a predetermined range from the display devices H with reference to the position of the display devices H when facing them; and the display position of the common image P1 in the left and right direction, with reference to the display position of the captured position P3 when facing the display devices, is set to be on the same side as the detected explainer position. As a result, at the second center, the common image P1 is displayed on the same side as the explainer E. Hence, at the first center, the explainer E participating at the second center is displayed to be pointing a finger toward the common image P1. Besides, at the second center, the participants U participating at the first center are displayed to be looking at the common image P1. As a result, among a plurality of centers participating in an electronic conference, it becomes possible to smoothly create an atmosphere of having a conversion with the focus on the common image P1 that represents the conference material.

Meanwhile, in the first to fourth embodiments, the information processing device installed at each center controls the display positions of a common image and a captured image on the corresponding display devices. However, it is not limited thereto. For example, a server that is connected via a network to the information processing device installed at each center can control the display positions of the common image and the captured image on the display devices of the information processing device installed at each center. In that case, the server functions as an information processing device configured to control the display positions of the common image and a captured image on the display devices. Moreover, the information processing device installed at each center can display the common image and the captured image on an external display device installed at the same center (i.e., on a display device other than the display devices included in that information processing device), and can control the display positions of the common image and the captured image.

The computer programs executed in the information processing devices according to the embodiments are recorded in the form of installable or executable files in a computer-readable recording medium such as a compact disk read only memory (CD-ROM), a flexible disk (FD), a compact disk readable (CD-R), or a digital versatile disk (DVD).

Alternatively, the computer programs executed in the information processing devices according to the embodiments can be saved as downloadable files on a computer connected to the Internet or can be made available for distribution through a network such as the Internet.

Still alternatively, the computer programs executed in the information processing devices according to the embodiments can be stored in advance in a ROM or the like.

Meanwhile, the computer programs executed in the information processing devices according to the embodiments contain a module for each of the abovementioned constituent elements (the initial positional relationship determining unit, the positional relationship sending unit, the positional relationship receiving unit, the positional relationship determining unit, the picture switching unit, the first output unit, the second output unit, the picture receiving unit, the information obtaining unit, the camera display positional relationship obtaining unit, the picture synthesizing unit, the output unit, and the explainer detecting unit) to be implemented in a computer. In practice, for example, a CPU (a processor) reads computer programs from the abovementioned recording medium and runs them such that the computer programs are loaded in a main memory device. As a result, the initial positional relationship determining unit, the positional relationship sending unit, the positional relationship receiving unit, the positional relationship determining unit, the picture switching unit, the first output unit, the second output unit, the picture receiving unit, the information obtaining unit, the camera display positional relationship obtaining unit, the picture synthesizing unit, the output unit, and the explainer detecting unit are generated in the main memory device.

According to an aspect, when a first image and a second image, which is obtained by an image capturing unit by capturing the image in front of a display screen of another display device having a display area capable of displaying the first image, is displayed on a display device that is installed at a different location than the other display device; it becomes possible to prevent a situation in which the lines of sight of the persons captured in the second image are not directed in the direction of the display position of the first image and thus appear unnatural.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device that displays a first image and a second image, which is obtained by an image capturing unit by capturing the image in front of a display screen of a first display device capable of displaying the first image from around the display screen, on a second display device that is installed at a different location than the first display device, the information processing device comprising a display control unit that displays the first image and the second image on the second display device in such a way that, when displaying the first image and the second image side-by-side in a left and right direction when facing the second display device, a display position of the first image in the left and right direction with reference to a display position of the second image when facing the second display device is opposite to a display position of the first image in the left and right direction with reference to the position of the image capturing unit when facing the display screen.

2. The information processing device according to claim 1, further comprising a receiving unit that receives position information related to the display position of the first image with reference to the image capturing unit when facing the display screen, wherein based on the received position information, the display control unit displays the first image and the second image on the second display device in such a way that the display position of the first image in the left and right direction with reference to the display position of the second image when facing the second display device is opposite to the display position of the first image in the left and right direction with reference to the position of the image capturing unit when facing the display screen.

3. The information processing device according to claim 1, further comprising a setting unit that sets an initial position which represents the display position of the first image in the left and right direction with reference to the display position of the second image when facing the second display device, wherein prior to receiving the position information, the display control unit displays the first image and the second image according to the initial position that has been set.

4. The information processing device according to claim 1, wherein the display control unit displays the first image and the second image on respective display devices.

5. The information processing device according to claim 1, wherein the display control unit displays the first image and the second image on a single screen.

6. The information processing device according to claim 1, further comprising a detecting unit that detects a person position which represents a position in the left and right direction of a person who is present within a predetermined range from the second display device with reference to the position of the second display device when facing the second display device, wherein with reference to the display position of the second image when facing the second display device, the display control device sets the display position of the first image in the left and right direction to be on the same side as the detected person position.

7. The information processing device according to claim 1, further comprising a sending unit that, with respect to another information processing device which displays, on the display screen, a captured image obtained by a second image capturing unit by capturing the image in front of a second display screen of the second display device, sends second position information which represents the display position of the first image in the left and right direction with reference to a position of the second image capturing unit when facing the second display screen.

8. A display control system that displays a first image and a second image, which is obtained by an image capturing unit by capturing the image in front of a display screen of a first display device capable of displaying the first image from around the display screen, on a second display device that is installed at a different location than the first display device, the display control system comprising a display control unit that displays the first image and the second image on the second display device in such a way that, when displaying the first image and the second image side-by-side in the left and right direction when facing the second display device, a display position of the first image in the left and right direction with reference to a display position of the second image when facing the second display device is opposite to a display position of the first image in the left and right direction with reference to the position of the image capturing unit when facing the display screen.

9. The display control system according to claim 8, further comprising a receiving unit that receives position information related to the display position of the first image with reference to the image capturing unit when facing the display screen, wherein based on the received position information, the display control unit displays the first image and the second image on the second display device in such a way that the display position of the first image in the left and right direction with reference to the display position of the second image when facing the second display device is opposite to the display position of the first image in the left and right direction with reference to the position of the image capturing unit when facing the display screen.

10. The display control system according to claim 8, further comprising a setting unit that sets an initial position which represents the display position of the first image in the left and right direction with reference to the display position of the second image when facing the second display device, wherein prior to receiving the position information, the display control unit displays the first image and the second image according to the initial position that has been set.

11. The display control system according to claim 8, wherein the display control unit displays the first image and the second image on respective display devices.

12. The display control system according to claim 8, wherein the display control unit displays the first image and the second image on a single screen.

13. The display control system according to claim 8, further comprising a detecting unit that detects a person position which represents a position in the left and right direction of a person who is present within a predetermined range from the second display device with reference to the position of the second display device when facing the second display device, wherein with reference to the display position of the second image when facing the second display device, the display control device sets the display position of the first image in the left and right direction to be on the same side as the detected person position.

14. The display control system according to claim 8, further comprising a sending unit that, with respect to a part which displays, on the display screen, a captured image obtained by a second image capturing unit by capturing the image in front of a second display screen of the second display device, sends second position information which represents the display position of the first image in the left and right direction with reference to a position of the second image capturing unit when facing the second display screen.

15. A computer program product comprising a non-transitory computer-usable medium having computer-readable program codes embodied in the medium, wherein the program codes, when executed by a computer that controls an information processing device which displays a first image and displays a second image obtained by an image capturing unit by capturing the image in front of a display screen of a first display device capable of displaying the first image from around the display screen, on a second display device that is installed at a different location than the first display device, cause the computer to function as:

a display control unit that displays the first image and the second image on the second display device in such a way that, when displaying the first image and the second image side-by-side in the left and right direction when facing the second display device, a display position of the first image in the left and right direction with reference to a display position of the second image when facing the second display device is opposite to a display position of the first image in the left and right direction with reference to the position of the image capturing unit when facing the display screen.

* * * * *